United States Patent
Fujita et al.

(10) Patent No.: US 10,108,177 B2
(45) Date of Patent: Oct. 23, 2018

(54) CONTROL PARAMETER ADJUSTMENT DEVICE

(71) Applicant: Mitsubishi Electric Corporation, Tokyo (JP)

(72) Inventors: Tomoya Fujita, Tokyo (JP); Kotaro Nagaoka, Tokyo (JP); Masahiro Ozawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 180 days.

(21) Appl. No.: 15/100,372

(22) PCT Filed: Jun. 18, 2015

(86) PCT No.: PCT/JP2015/067609
§ 371 (c)(1),
(2) Date: May 31, 2016

(87) PCT Pub. No.: WO2016/203614
PCT Pub. Date: Dec. 22, 2016

(65) Prior Publication Data
US 2017/0199510 A1     Jul. 13, 2017

(51) Int. Cl.
*G05B 19/402*     (2006.01)
*G05B 13/04*     (2006.01)

(52) U.S. Cl.
CPC ......... *G05B 19/402* (2013.01); *G05B 13/041* (2013.01); *G05B 2219/32341* (2013.01); *G05B 2219/42044* (2013.01)

(58) Field of Classification Search
CPC ............... G05B 19/402; G05B 13/041; G05B 2219/32341; G05B 2219/42044
(Continued)

(56) References Cited

U.S. PATENT DOCUMENTS 5,223,778 A * 6/1993 Svarovsky ............. G05B 11/42
                                           318/609
5,517,100 A    5/1996 Matsubara et al.
(Continued)

FOREIGN PATENT DOCUMENTS

DE    10 2004 029 790 A1    1/2006
JP            7-13631 A    1/1995
(Continued)

OTHER PUBLICATIONS

Written Opinion for PCT/JP2015/067609 dated Aug. 25, 2015 [PCT/ISA/237] pp. 14.
(Continued)

*Primary Examiner* — Jason Lin
*Assistant Examiner* — Olvin Lopez Alvarez
(74) *Attorney, Agent, or Firm* — Sughrue Mion, PLLC; Richard C. Turner

(57) ABSTRACT

A control parameter adjustment device includes a command-value generation unit that generates a position command; a servo control unit that calculates a drive command such that a response position of a driven object follows the position command; a correction model unit that generates a correction command for correcting a response error that is a difference between the position command and the response position by using a model expressed by two or more types of parameters; and a parameter search unit that corrects the model by using a combination of values of the parameters, by which the response error is minimized, among a plurality of combinations of values of the parameters. The control parameter adjustment device drives the driven object on the basis of the drive command and the correction command.

16 Claims, 28 Drawing Sheets

(58) Field of Classification Search
USPC .......................................................... 700/31
See application file for complete search history.

(56) References Cited

U.S. PATENT DOCUMENTS

| | | | |
|---|---|---|---|
| 5,656,906 A | 8/1997 | Iwashita et al. | |
| 5,805,447 A * | 9/1998 | Teng | G05B 13/0235 700/28 |
| 6,034,498 A * | 3/2000 | Hamamura | G05B 19/404 318/280 |
| 6,281,650 B1 * | 8/2001 | Yutkowitz | G05B 11/42 318/561 |
| 6,566,837 B1 * | 5/2003 | Zhang | G05B 19/19 318/610 |
| 7,084,596 B2 | 8/2006 | Iwashita et al. | |
| 7,664,556 B2 * | 2/2010 | Tanaka | G05B 17/02 700/30 |
| 8,836,528 B2 | 9/2014 | Tezuka et al. | |
| 2002/0156541 A1 * | 10/2002 | Yutkowitz | G05B 11/28 700/28 |
| 2006/0064181 A1 * | 3/2006 | Kato | G05B 13/042 700/42 |
| 2007/0085506 A1 * | 4/2007 | Oks | G05B 19/318 318/609 |
| 2007/0118237 A1 * | 5/2007 | Wang | G05B 17/02 700/31 |
| 2008/0012520 A1 * | 1/2008 | Matsumoto | G05B 19/41 318/630 |
| 2008/0059042 A1 * | 3/2008 | Yasui | F02D 41/1401 701/102 |
| 2009/0198350 A1 * | 8/2009 | Thiele | G05B 13/042 700/30 |
| 2012/0283851 A1 * | 11/2012 | Yamamoto | G05B 19/19 700/56 |
| 2013/0057186 A1 * | 3/2013 | Tanabe | H02P 23/30 318/400.15 |
| 2013/0073061 A1 * | 3/2013 | Mu | G05B 13/041 700/29 |
| 2013/0222391 A1 | 8/2013 | Tezuka et al. | |
| 2015/0084572 A1 * | 3/2015 | Tanaka | G05B 11/42 318/568.1 |
| 2015/0177710 A1 * | 6/2015 | Kigaku | G05B 13/02 318/561 |
| 2015/0219510 A1 * | 8/2015 | Takahashi | G01L 3/22 702/41 |
| 2015/0323924 A1 | 11/2015 | Nagaoka et al. | |
| 2016/0327932 A1 * | 11/2016 | Shinohara | G05B 11/01 |
| 2017/0153611 A1 * | 6/2017 | Fujii | G05B 13/044 |

FOREIGN PATENT DOCUMENTS

| | | |
|---|---|---|
| JP | 11-24754 A | 1/1999 |
| JP | 2004-234327 A | 8/2004 |
| JP | 2005-348536 A | 12/2005 |
| JP | 2010-130778 A | 6/2010 |
| JP | 2013-175073 A | 9/2013 |
| JP | 2014-21769 A | 2/2014 |
| JP | 2015-18496 A | 1/2015 |
| WO | 00/62412 A1 | 10/2000 |
| WO | 2014/122822 A1 | 8/2014 |
| WO | 2015/083417 A1 | 6/2015 |

OTHER PUBLICATIONS

International Search Report for PCT/JP2015/067609 dated Aug. 25, 2015 [PCT/ISA/210], pp. 3.
Communication dated Jun. 29, 2018, issued by the German Patent Office in counterpart German Application No. 112015000231.6.

* cited by examiner

RADIUS 10 mm, FEED VELOCITY 800 mm/min

RADIUS 20 mm, FEED VELOCITY 3000 mm/min

RADIUS 10 mm, FEED VELOCITY 800 mm/min

RADIUS 20 mm, FEED VELOCITY 3000 mm/min

RADIUS 10 mm, FEED VELOCITY 800 mm/min

RADIUS 20 mm, FEED VELOCITY 3000 mm/min

CONTROL PARAMETER ADJUSTMENT DEVICE

CROSS REFERENCE TO RELATED APPLICATIONS

This application is a National Stage of International Application No. PCT/JP2015/067609, filed on Jun. 18, 2015, the contents of which are incorporated herein by reference in their entirety.

FIELD

The present invention relates to a control parameter adjustment device that adjusts a control parameter. An example of such a device is a servo control device for a machine tool.

BACKGROUND

A servo control device for a machine tool generates a command for an actuator in order that the position of a driven object such as a tool or a table provided in the machine tool follows the command value. There are various types of actuators for the servo control device such as a rotary motor, a linear motor, and a piezoelectric element.

A servo control, as executed by a servo control device for a machine tool, which drives a mechanical system in a mechanical device such that the position of a tool relative to a workpiece precisely follows an instructed trajectory in order to machine the workpiece into a designed shape, is referred to as "trajectory control" or "contouring-motion control". These controls are executed accurately by using a numerical control device or a servo control device provided in a numerical control device. A mechanical system of a control-target mechanical device is provided with a plurality of shafts, each of which is controlled by a motor. Driving of the motor is controlled by using the servo control device.

In the servo control device, a response error is caused due to a disturbance such as a friction that occurs in the mechanical system, or vibrations of the mechanical structure. As a typical example, in a case where two servo control devices set as perpendicular to each other are used to instruct an arc trajectory, when the movement direction of a feed shaft is reversed at a point where the quadrant of the arc is changed across to another quadrant, a response error occurs. When the amount of this error is scaled-up in the radial direction and is plotted, then the trajectory has an outwardly protruding shape. Therefore, this error is referred to as "quadrant projection". When a response error on the trajectories such as a quadrant projection is caused, this forms undesirably a blemish or scratch on the machined product. As another example, a response error is caused by mechanical vibrations generated when a motor is accelerated/decelerated. The mechanical vibrations are generated when a mechanical structure is vibrated by a driving force or a driving reaction force generated when a motor is accelerated/decelerated. When the mechanical vibrations are generated, a blemish is formed on the machined surface, or an uneven machined surface is undesirably formed thereby.

In correction of a response error due to a friction or vibrations, there is a frequently used error reducing method that estimates a generated error by using a model so as to input a necessary correction command for cancelling out the error. In order to perform this method, it is necessary to determine a model parameter by which the amount of generated response error is made equal to or smaller than the allowable value.

The linear approximation of an error model or the model order reduction is performed so as to implement the error model in a practical controller of the servo control device. Therefore, even when a parameter value is identified on the basis of measurement results, the amount of generated response error is not minimized in some cases. Accordingly, a control parameter adjustment device is needed which has a control parameter adjustment function of searching for or finely adjusting a model parameter such that the amount of response error caused in a servo control is made equal to or smaller than an allowable value.

For example, in Patent Literature 1, a servo control device has a model to input a correction torque in a step shape, when the motion direction is reversed, in order to correct a quadrant projection. The servo control device corrects a torque command and updates the correction torque repeatedly up until the amount of quadrant projection generated during arc motion becomes equal to or smaller than a threshold. A method for deciding an optimal parameter through this operation has been disclosed.

CITATION LIST

Patent Literature

Patent Literature 1: Japanese Patent Application Laid-open No. H11-24754

SUMMARY

Technical Problem

When only one type of parameter is used, there are limitations to more accurately correcting a quadrant projection. Therefore, it is necessary to use two or more types of parameters. However, there are the following problems in applying the method disclosed in Patent Literature 1 to a parameter search for a correction model configured with a plurality of parameters.

The first problem is that this method cannot manage the case where a parameter cannot be determined independently. When it is assumed that all parameters are independent, the value of each parameter minimizing the amount of quadrant projection is determined by the method disclosed in Patent Literature, and then it is possible to find a combination of the parameters minimizing the amount of quadrant projection. However, there is a case where parameters are not independent, and upon deciding one parameter in that case, a response error shows different trends according to the value of another parameter. The method mentioned above is not adaptable to that case.

The second problem is that the method disclosed in Patent Literature 1 cannot address the case where there are a plurality of combinations of parameters by which the amount of response error is equal to or smaller than an allowable value. In a model made up of a plurality of types of parameters, when the parameters are not independent at all, there may be a plurality of combinations of parameters by which the amount of response error is equal to or smaller than an allowable value. In that case, it is necessary to determine a single combination which is the most preferable among the potential combinations of parameters.

Another method can be thought that identifies a model parameter online by using a disturbance observer or other devices. However, as described above, approximation of a correction model or the model-order reduction has been performed, so that the identified model parameter does not always minimize a generated error.

The present invention has been achieved to solve the above problems, and an objective of the present invention is to provide a control parameter adjustment device that can simply with high accuracy adjusting an optimal parameter combination of a model made up of a plurality of types of parameters.

Solution to Problem

In order to solve the problems and achieve the objective, the present invention relates to a control parameter adjustment device that includes: a command-value generation unit that generates a position command; a servo control unit that calculates a drive command such that a response position of a driven object follows the position command; a correction model unit that generates, by using a model expressed by two or more types of parameters, a correction command for correcting a response error that is a difference between the position command and the response position; and a parameter search unit that corrects the model by using a combination of values of the parameters by which the response error is minimized, the combination of values of the parameters being from among a plurality of combinations of values of the parameters. The control parameter adjustment device drives the driven object in accordance with the drive command and the correction command.

Advantageous Effects of Invention

The control parameter adjustment device according to the present invention is capable of simply with high accuracy adjusting an optimal parameter combination of a model made up of a plurality of types of parameters.

DESCRIPTION OF EMBODIMENTS

Exemplary embodiments of a control parameter adjustment device according to the present invention will be explained below in detail with reference to the accompanying drawings. The present invention is not limited to the embodiments.

First Embodiment

Figure 1:
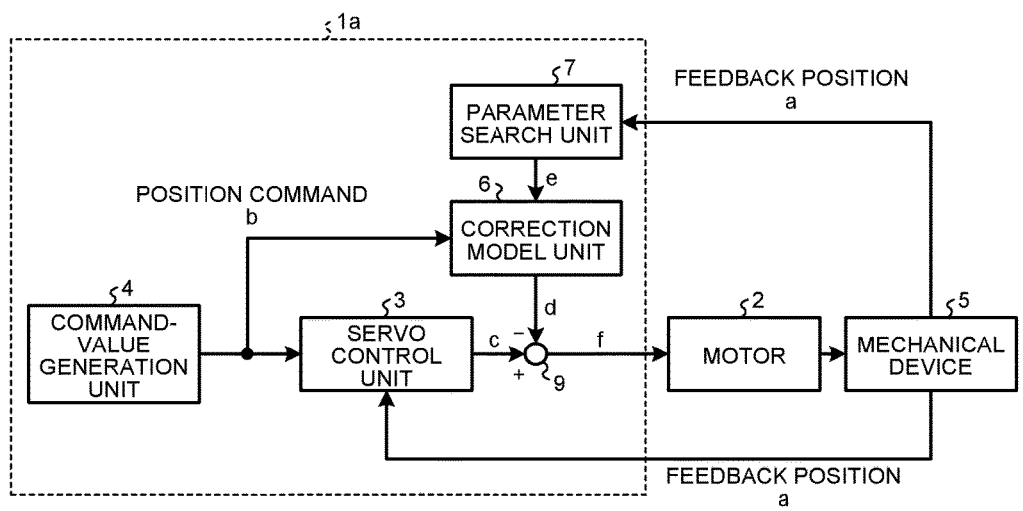
FIG. 1 is a block diagram illustrating a configuration of a control parameter adjustment device according to a first embodiment of the present invention.

FIG. 1 is a block diagram illustrating a configuration of a control parameter adjustment device 1a according to a first embodiment of the present invention. In FIG. 1, the actuator, i.e., a motor 2, for the control parameter adjustment device 1a is specifically a rotary motor. A mechanical device 5, which is the control-target of a driven object, is connected to the motor 2. The control parameter adjustment device 1a includes a command-value generation unit 4 that generates one or more types of position commands "b"; a servo control unit 3 that outputs a drive command; a correction model unit 6 that generates a correction command; and a parameter search unit 7 that outputs a model-parameter change command "e".

Figure 2:
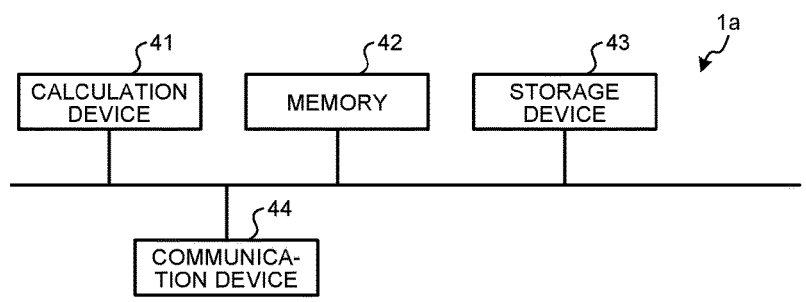
FIG. 2 is a diagram illustrating a hardware configuration of the control parameter adjustment device according to the first embodiment.

FIG. 2 is a diagram illustrating a hardware configuration of the control parameter adjustment device 1a according to the first embodiment. The control parameter adjustment device 1a includes a calculation device 41, such as a central processing unit (CPU), that performs calculation processing; a memory 42 that is used by the calculation device 41 as a work area; a storage device 43 that stores therein software; and a communication device 44 that has a function for communicating with an external device. The functions of the control parameter adjustment device 1a illustrated in FIG. 1 are implemented by the calculation device 41 executing software.

Figure 3:
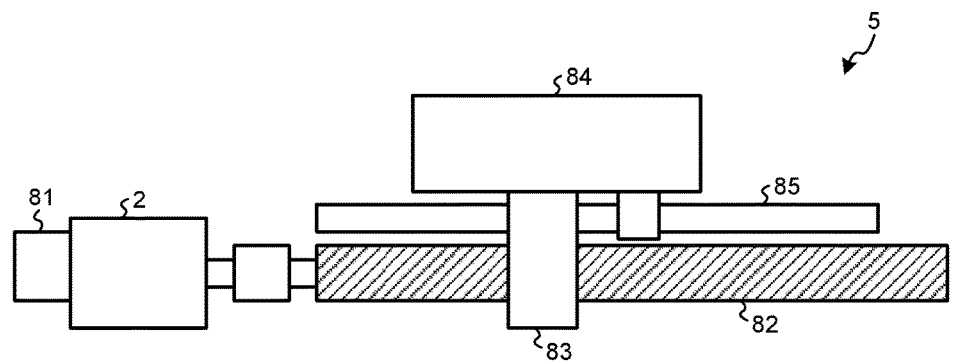
FIG. 3 is a side view illustrating an example of a mechanical configuration of a mechanical device that is a control target for the control parameter adjustment device according to the first embodiment.

FIG. 3 is a side view illustrating an example of a mechanical configuration of the mechanical device 5 that is a control target for the control parameter adjustment device 1a according to the first embodiment. The control target in the mechanical device 5 is a table 84. The motor 2, which is an actuator, is attached to the mechanical system as illustrated in FIG. 3. A ball screw 82 is coupled to the rotary shaft of the motor 2. A movable portion made up of a nut 83 and the table 84 is mounted on the ball screw 82. The nut 83 is fixed to the backside of the table 84 and converts the rotary motion of the ball screw 82 into linear motion. The table 84 is supported by a guide mechanism (not illustrated) and the degree of flexibility in movement is restricted to the guide's movable direction.

As illustrated in FIG. 3, a motor-position detector 81 is attached to the motor 2. A rotary encoder is a specific example of the motor-position detector 81. A table-position detector 85 is also attached to the movable portion in order to measure the position of the table 84, which is a target for control. A specific example of the table-position detector 85 is a linear encoder. The mechanical device 5 outputs, to the servo control unit 3, either a detected motor position, a table position, or both as a response position that is a feedback position "a".

The table-position detector 85 can measure the movement distance of the table 84, and the motor-position detector 81 can directly detect the position that is the rotation angle of the motor 2. However, this rotation angle can be converted into a length in the movement direction of the table 84 by multiplying this rotation angle by the ball-screw lead that is the table movement distance per revolution of the motor 2, and then by dividing the result of the multiplication by the angle $2\pi$ [rad] of one motor revolution.

A case where the motor-position detector 81 is used to obtain the feedback position "a" is referred to as "semi-closed-loop control". The case where the motor-position detector 81 and the table-position detector 85 are both used or only the table-position detector 85 is used to obtain the feedback position "a" is referred to as "full-closed-loop control".

Figure 4:
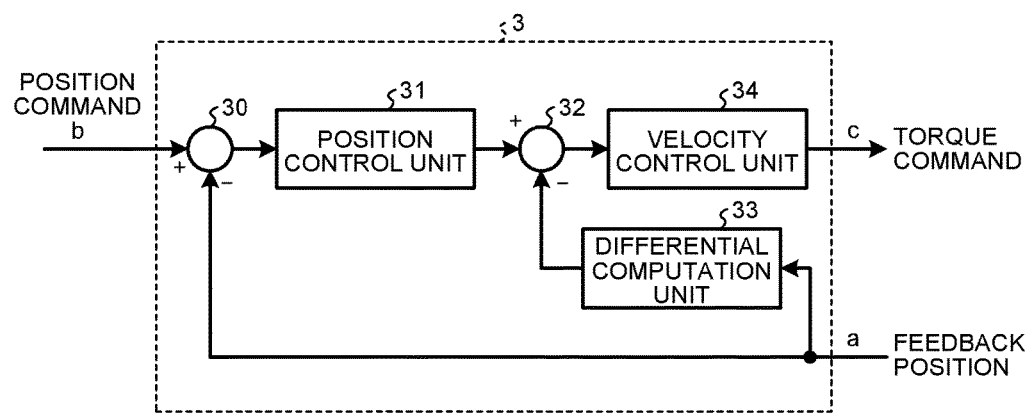
FIG. 4 is a block diagram illustrating an example configuration of a servo control unit according to the first embodiment.

Both the position command "b" is input from the command-value generation unit 4 and also the feedback position "a" is input from the mechanical device 5 to the servo control unit 3. FIG. 4 is a block diagram illustrating an example configuration of the servo control unit 3 according to the first embodiment.

As illustrated in FIG. 4, the servo control unit 3 includes an addition-subtraction unit 30 that obtains a response error that is the difference between the position command "b" and the feedback position "a", which is the response position; a position control unit 31 that receives the deviation obtained by the addition-subtraction unit 30; a differential calculation unit 33 that performs differential calculation; an addition-subtraction unit 32 that obtains the deviation between a velocity command obtained by the position control unit 31 and an actual velocity obtained by the differential calculation unit 33; and a velocity control unit 34 that outputs a torque command "c" that is a drive command.

In FIG. 4, the addition-subtraction unit 30 obtains a position deviation that is a deviation between the position command "b" and the feedback position "a", and outputs the position deviation to the position control unit 31. The position control unit 31 performs a position-control process such as a proportional control so as to reduce the position deviation input from the addition-subtraction unit 30, and it then outputs a velocity command for reducing the position deviation. The differential calculation unit 33 differentiates the feedback position "a" to obtain the actual velocity. However, in the case of full-closed-loop control, a value detected by the motor-position detector 81 is input to the differential calculation unit 33; and a value detected by the table-position detector 85 is input to the addition-subtraction unit 30.

The addition-subtraction unit 32 obtains a velocity deviation that is a deviation between a velocity command obtained by the position control unit 31 and an actual velocity obtained by the differential calculation unit 33, and it then outputs the obtained velocity deviation to the velocity control unit 34. The velocity control unit 34 performs a velocity-control process such as a proportional-integral control so as to reduce the velocity deviation that is input from the addition-subtraction unit 32, and it then outputs the torque command "c".

Typically, the motor 2 is directly driven according to the torque command "c" calculated as a result of the servo control executed by the servo control unit 3. However, in the control parameter adjustment device 1a according to the first embodiment, an adder-subtractor 9 is provided as illustrated in FIG. 1, and the torque command "c" calculated as a result of the servo control executed by the servo control unit 3 is used as one of the inputs to the adder-subtractor 9.

The correction model unit 6 generates a correction torque "d" that is a correction command for reducing the generated response error. The correction model unit 6 is a vibration model for reducing vibrations of the mechanical device 5, which is a model expressed by using two or more types of parameters. The correction model unit 6 in the first embodiment is expressed by a quadratic transfer function expressed as the following equation (1).

[Equation 1]

$$G(s) = \frac{s^2 \omega^2}{s^2 + 2\zeta\omega + \omega^2} \tag{1}$$

In the equation (1), the correction model unit 6 is a transfer function model configured by two parameters, which are a resonant frequency $\omega$ and an attenuation coefficient $\zeta$, in which mechanical vibrations are approximated, and where "s" represents a Laplace operator. The transfer function model is used, in which the mechanical vibrations are approximated, and therefore a parameter search, described later, can be performed in a reduced period of time. The resonant frequency $\omega$ and the attenuation coefficient $\zeta$ are two dependent parameters, each of which cannot be independently determined. They are dependent because characteristics of the vibration model are changed according to the value of the other parameter. The correction model unit 6 outputs the correction torque "d", which is equivalent to a torque component of vibrations to be generated in a machine when the position command "b" is input.

The adder-subtractor 9 subtracts the correction torque "d" from the torque command "c" so as to obtain a torque command "f" from which a vibration component has been removed, and it outputs the torque command "f" to the motor 2. That is, the driven object is driven according to the torque command "f". With this operation, vibrations generated in the mechanical device 5 are reduced.

The command-value generation unit 4 generates the position command "b" for the servo control unit 3. In this example, the command-value generation unit 4 repeatedly sends out instructions for simple reciprocating motion between two points. As a specific example, the reciprocating motion is performed within the range of 20 mm at a feed velocity of 5000 (m/min).

Each time the servo control unit 3 completes a single reciprocating motion, the parameter search unit 7 measures the feedback position "a" and stores therein data on the measured feedback position "a". The parameter search unit 7 also outputs the model-parameter change command "e" to the correction model unit 6. At this time, the resonant frequency ω and the attenuation coefficient ζ, which are model parameters, are changed in given steps of Δω and Δζ, respectively.

When all the measurements are completed, the parameter search unit 7 selects, from among the changed parameters, a combination of parameters by which the response-error evaluation function H is minimized, and it then informs the correction model unit 6 of the selected combination.

It is assumed that, in the equation (1), the resonant frequency is 45 Hz, which means ω=90π, and the attenuation coefficient is 5%, which means ζ=0.05, then the frequency response of the mechanical device 5 from the position command "b" to the feedback position "a" can be expressed by a quadratic transfer function expressed as the following equation (2).

[Equation 2]

$$G(s) = \frac{s^2(90\pi)^2}{s^2 + 2 \cdot 0.05 \cdot 90\pi + (90\pi)^2} \quad (2)$$

Figure 5:
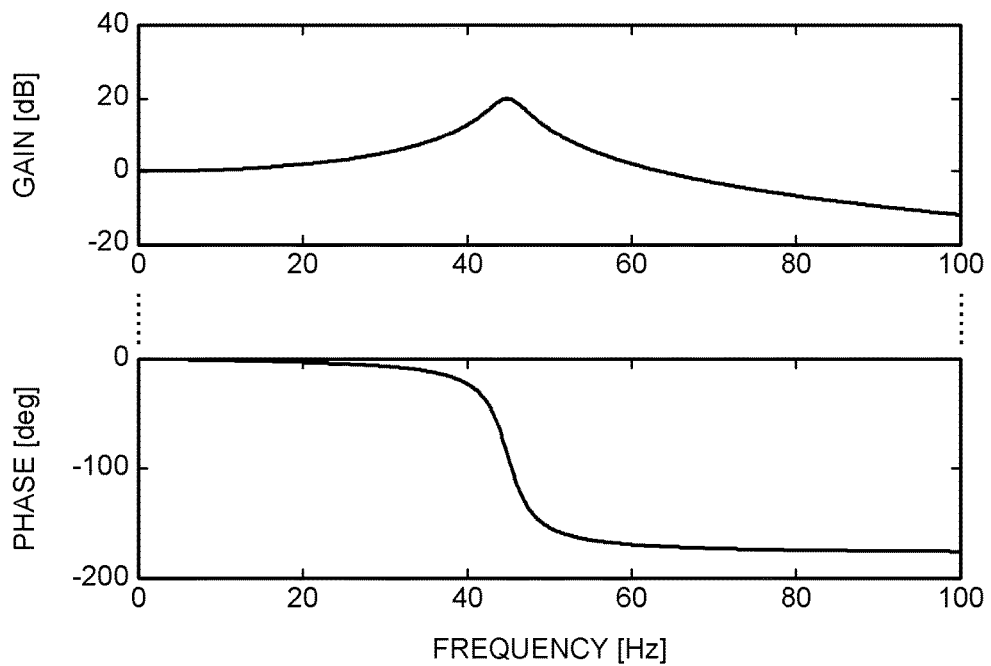
FIG. 5 is a Bode plot of a frequency response when a transfer function of a correction model unit according to the first embodiment is expressed as the equation (2).
Figure 6:
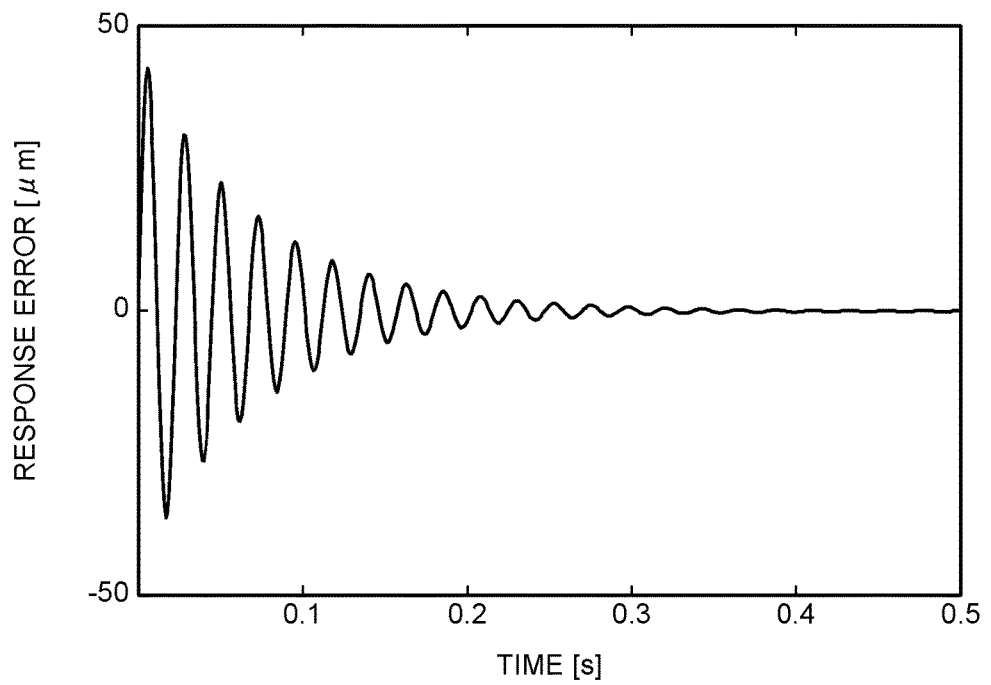
FIG. 6 is a diagram illustrating a time-series waveform of a vibrating response error caused at a feedback position "a" in a case where a motor is driven without using the correction model unit according to the first embodiment.

FIG. 5 is a Bode plot of the frequency response when the transfer function of the correction model unit 6 according to the first embodiment is expressed as the equation (2). FIG. 6 is a diagram illustrating a time-series waveform of a vibrating response error caused at the feedback position "a" in a case where the motor 2 is driven without using the correction model unit 6 according to the first embodiment.

Figure 7:
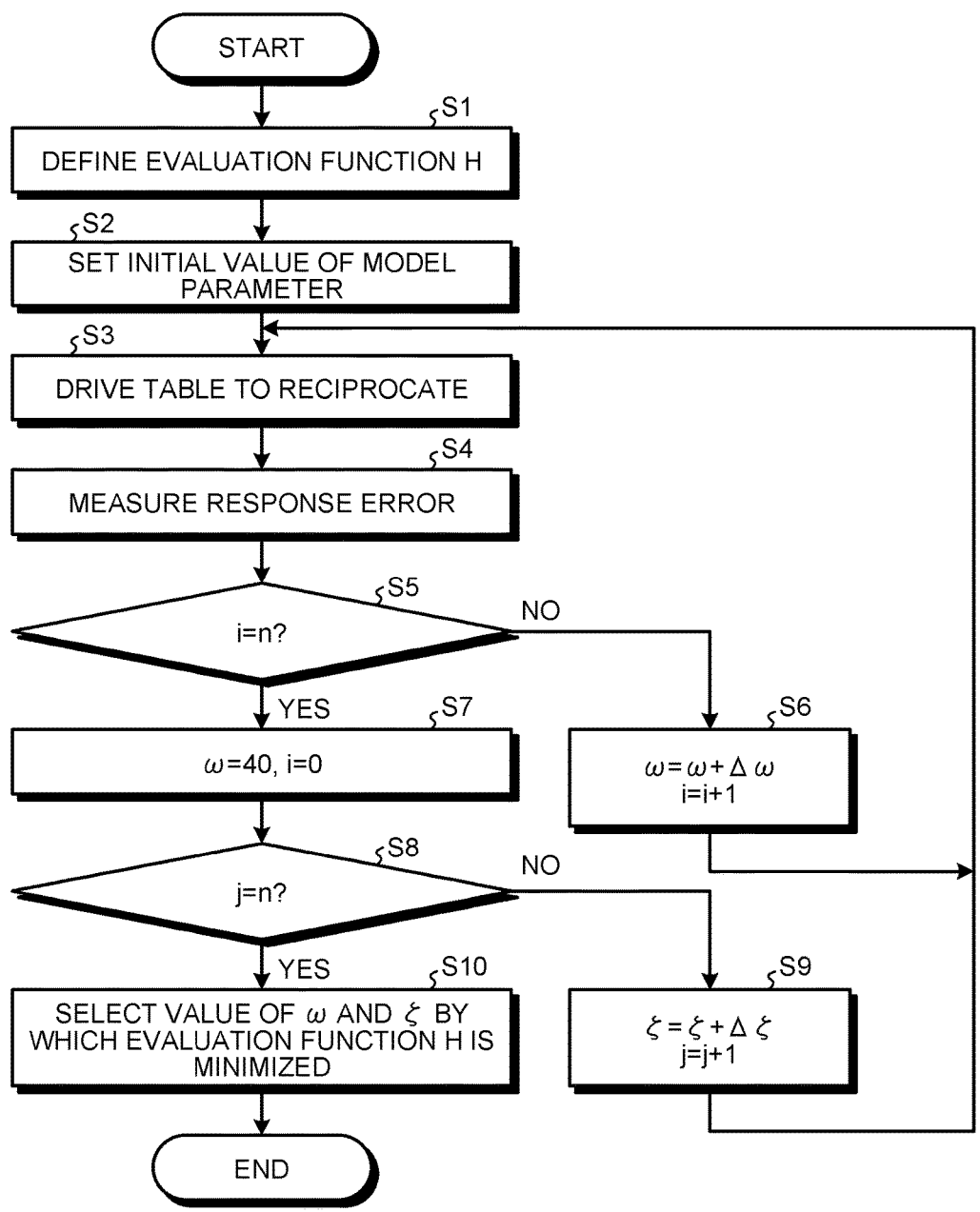
FIG. 7 is a flowchart illustrating a procedure of control parameter adjustment by using the control parameter adjustment device in the first embodiment.

The control parameter adjustment procedure using the control parameter adjustment device 1a at this time is described here. FIG. 7 is a flowchart illustrating the control parameter adjustment procedure using the control parameter adjustment device 1a in the first embodiment.

First, at Step S1, the evaluation function H, which used when a parameter is searched, is defined. The evaluation function H differs depending on the purpose of control. In this example, as expressed by the following equation (3), the maximum error between the position command "b" and the feedback position "a" is defined as the evaluation function H, where abs represents an absolute function and max represents a function to extract the maximum value. The evaluation function H evaluates the amount of generated response error.

[Equation 3]

$$H = \max(\text{abs}(b-a)) \quad (3)$$

At Step S2, the initial value of a model parameter of the correction model unit 6 is set. In this example, ω=40 Hz and ζ=0.01 are set. Further, the number of parameter changes "i" at the resonant frequency ω and the number of parameter changes "j" in the attenuation coefficient ζ are both initialized to 0. An upper-limit value "n" of the number of parameter changes is set to 10. Furthermore, Δω=1 and Δζ=0.01 are set.

At Step S3, the command-value generation unit 4 instructs there to be reciprocating motion of the table 84 and drives the table 84 so that it reciprocates.

At Step S4, the feedback position "a" during the reciprocating motion is stored in the parameter search unit 7 in order to measure response error.

At Step S5, it is determined whether the number of parameter changes "i" at the resonant frequency ω is equal to "n" (i=n). When "i" is less than "n" (NO at Step S5), the process flow advances to Step S6 to change the value of ω and the value of "i" to ω=ω+Δω and i=i+1 respectively, and it then returns to Step S3 to repeat the measurement.

At Step S5, when i=n (YES at Step S5), the value of ω and the value of "i" are returned to their respective initial values at ω=40 and i=0 (at Step S7). Thereafter, at Step S8, it is determined whether the number of parameter changes "j" in the attenuation coefficient ζ is equal to "n" (j=n). When "j" is less than "n" (NO at Step S8), the process flow advances to Step S9 to change the value of ζ and the value of "j" to ζ=+Δζ and j=j+1 respectively, and it then returns to Step S3 to repeat a measurement.

At Step S8, when j=n (YES at Step S8), this indicates that the measurements have been completed under n² conditions. Therefore, at Step S10, among the measurement results, a combination of the parameter values, by which the value of the resonant frequency ω and the value of the attenuation coefficient ζ minimize the evaluation function H, is selected from a plurality of combinations of the parameter values. The corresponding parameter values are set in the correction model unit 6 to correct the model.

Figure 8:
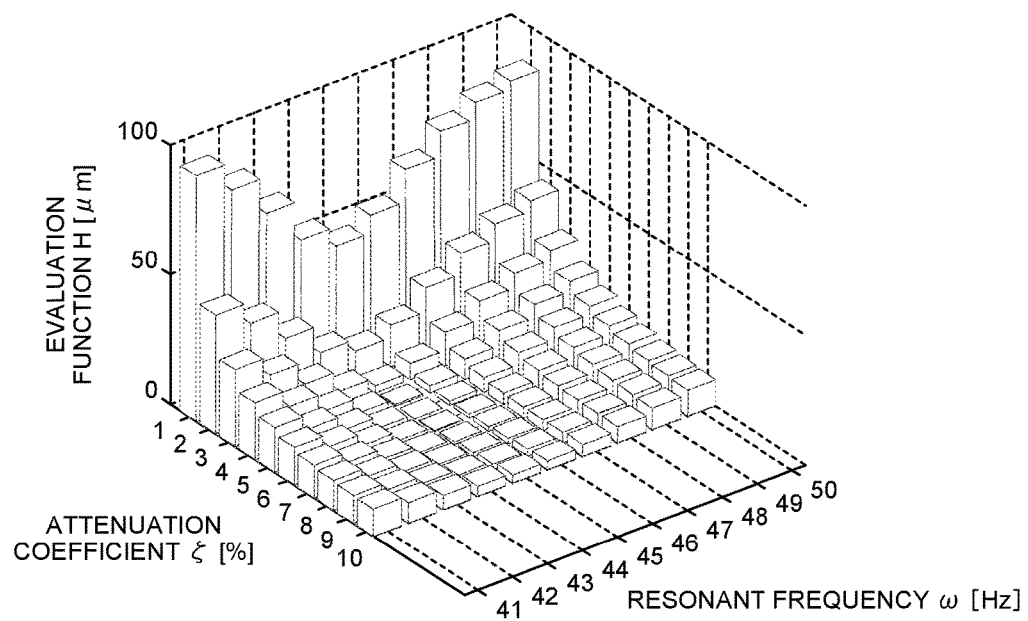
FIG. 8 is a three-dimensional bar graph illustrating the relation between the respective values of two parameters $\omega$ and $\zeta$ and the value of an evaluation function H in the first embodiment.
Figure 9:
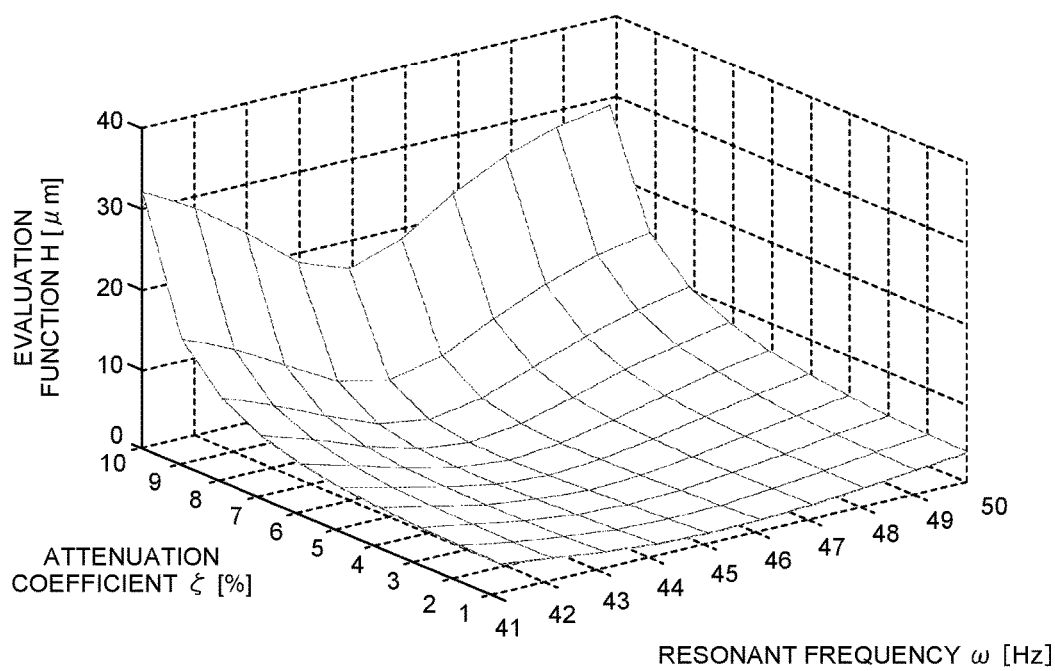
FIG. 9 is a three-dimensional mesh graph illustrating the relation between the respective values of the two parameters $\omega$ and $\zeta$ and the value of the evaluation function H in the first embodiment.

FIG. 8 is a three-dimensional bar graph illustrating the relation between the respective values of the two parameters ω and ζ and the value of the evaluation function H in the first embodiment. FIG. 9 is a three-dimensional mesh graph illustrating the relation between the respective values of the two parameters ω and ζ and the value of the evaluation function H in the first embodiment.

As illustrated in FIGS. 8 and 9, when the parameter is set to the resonant frequency of 45 Hz and the attenuation coefficient of 5% is expressed by the equation (2), the value of the generated response error is minimized. Therefore, the parameter search unit 7 outputs a combination of these parameter values to the correction model unit 6 to correct the model.

As described above, in the control parameter adjustment device 1a according to the first embodiment, the command-value generation unit 4 generates a repetitive position command such as a reciprocating motion of the table 84 while changing a parameter repeatedly, and therefore the control parameter adjustment device 1a can obtain an optimal combination of parameter values in a reduced period of time. With this operation, an optimal parameter combination can be determined simply with high accuracy, even though the system characteristics shown by a model made up of a plurality of parameters are unknown.

The parameter optimization method described above is applicable regardless of whether two or more types of parameters, which express the correction model unit 6, affect the response error in concert or separately. Therefore, this parameter optimization method is also applicable to two or more types of dependent parameters. That is, the parameter optimization method described above is still applicable to the case where two or more types of parameters are dependent parameters that cannot express their influence on the response error by using a linear expression of these parameters.

Second Embodiment

Figure 10:
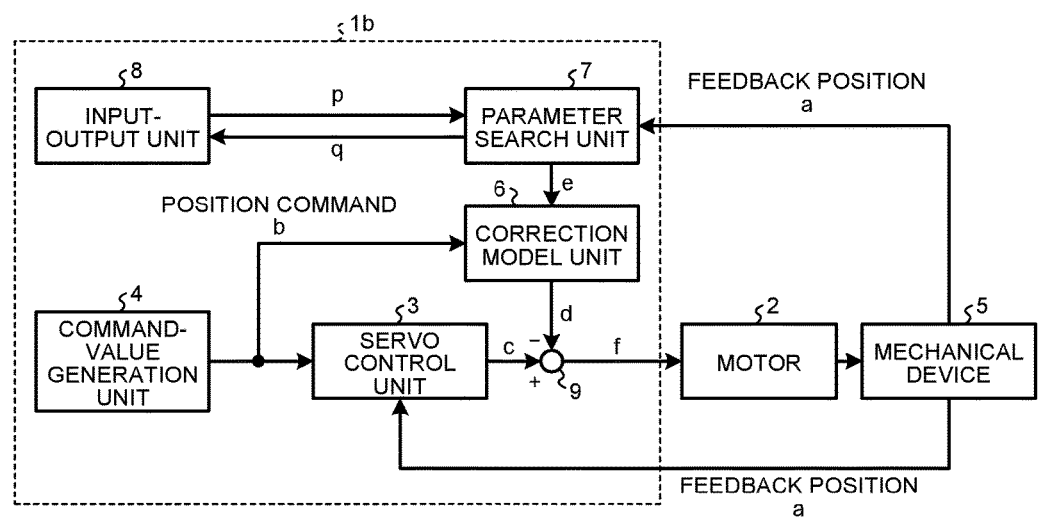
FIG. 10 is a block diagram illustrating a configuration of a control parameter adjustment device according to a second embodiment of the present invention.

FIG. 10 is a block diagram illustrating a configuration of a control parameter adjustment device 1b according to a second embodiment of the present invention. One difference between the configuration of control parameter adjustment device 1b according to the second embodiment and the control parameter adjustment device 1a according to the first embodiment is the presence or absence of an input-output unit 8. The hardware configuration of the control parameter adjustment device 1b according to the second embodiment excluding the input-output unit 8 is identical to FIG. 2.

The input-output unit 8 is an interface that receives a user's inputs of the initial value of a parameter search and the evaluation function and then outputs a result of the parameter adjustment performed by the parameter search unit 7 to a user. Information transmitted from the input-output unit 8 to the parameter search unit 7 is illustrated as a signal "p". Information transmitted from the parameter search unit 7 to the input-output unit 8 is illustrated as a signal "q".

Figure 11:
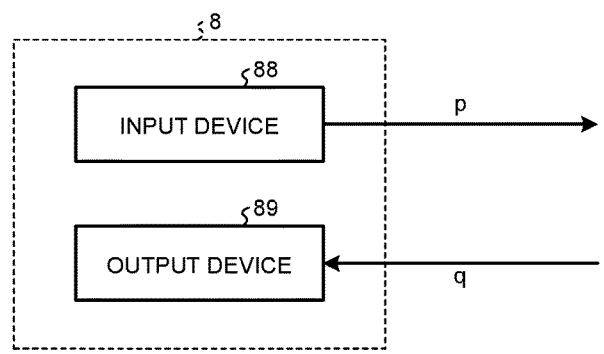
FIG. 11 is a block diagram illustrating an example configuration of an input-output unit according to the second embodiment.

FIG. 11 is a block diagram illustrating an example configuration of the input-output unit 8 according to the second embodiment. An input device 88 is a device for an operator to perform an input operation. A keyboard is a specific example of the input device 88. An output device 89 outputs an adjustment result to an operator. A monitor is a specific example of the output device 89. It is also possible that the input-output unit 8 is configured as a touch panel in which the input device 88 and the output device 89 are integrated with each other. Information transmitted from the input device 88 to the parameter search unit 7 is illustrated as the signal "p". Information transmitted from the parameter search unit 7 to the output device 89 is illustrated as the signal "q".

In the second embodiment, a correction model of the correction model unit 6 is a quadratic transfer function similar to the equation (1).

It is assumed that, as expressed by the following equation (4), the frequency response of the mechanical device 5 from the position command "b" to the feedback position "a" can be expressed as a fourth-order transfer function, where the resonant frequency $\zeta 1=45$ Hz and $\omega 2=47$ Hz, and with the attenuation coefficients $\zeta 1=5\%$ and $\zeta 2=10\%$.

[Equation 4]

$$G(s) = \frac{s^2(90\pi)^2}{s^2 + 2\cdot 0.05\cdot 90\pi + (90\pi)^2} \frac{s^2(94\pi)^2}{s^2 + 2\cdot 0.1\cdot 94\pi + (4\pi)^2} \quad (4)$$

Figure 12:
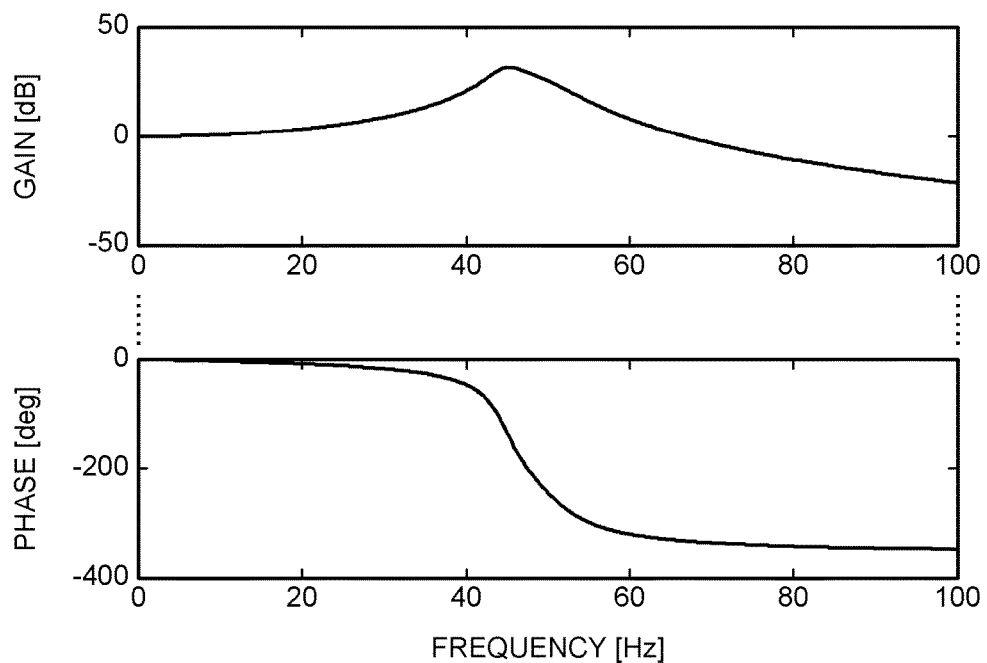
FIG. 12 is a Bode plot of a frequency response when a transfer function is expressed as the equation (4) in the second embodiment.
Figure 13:
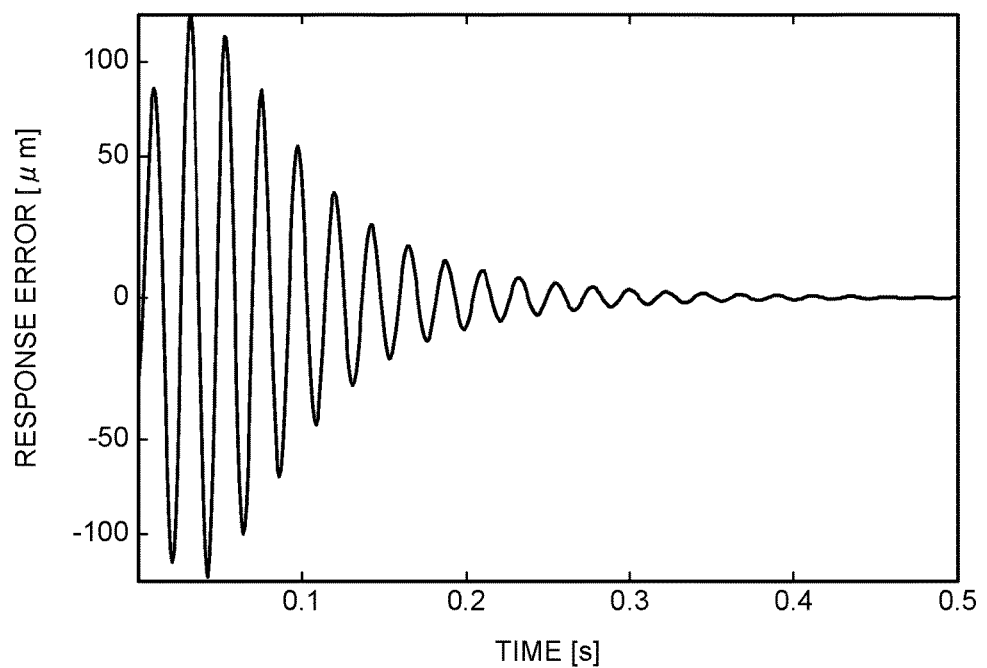
FIG. 13 is a diagram illustrating a time-series waveform of a vibrating response error caused at the feedback position "a" in a case where the motor is driven without using the correction model unit according to the second embodiment.

FIG. 12 is a Bode plot of a frequency response when a transfer function is expressed as the equation (4) in the second embodiment. FIG. 13 is a diagram illustrating a time-series waveform of a vibrating response error caused at the feedback position "a" in a case where the motor 2 is driven without using the correction model unit 6 according to the second embodiment.

When the mechanical-system characteristics are expressed by the fourth-order transfer function as described above, it is most preferable for the correction model unit 6 to use a fourth-order transfer function model that is similar to the mechanical-system characteristics. However, under the constraints on the memory 42 and the CPU that performs calculation of the correction model unit 6, there is generally a limit to the extension of the order of the correction model unit 6.

In that case, it is necessary to find a combination of parameters minimizing the evaluation function H by using a limited-order correction model. However, when a plurality of resonant frequencies or anti-resonant frequencies are present in the close-frequency range, it may be difficult to derive an optimum parameter combination that minimizes the evaluation function from theoretical calculation.

Figure 14:
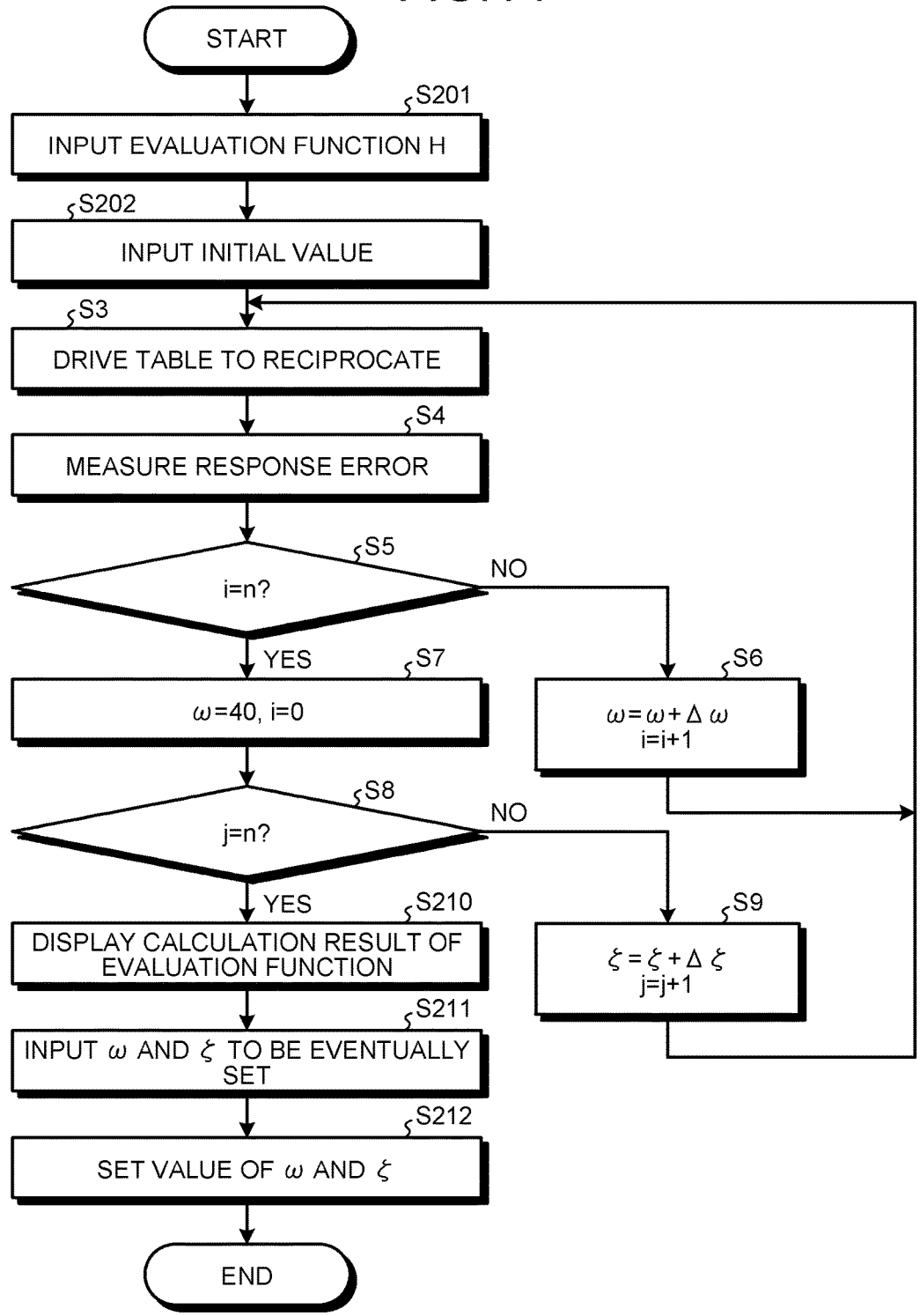
FIG. 14 is a flowchart illustrating a control parameter adjustment procedure using the control parameter adjustment device in the second embodiment.

FIG. 14 is a flowchart illustrating a control parameter adjustment procedure using the control parameter adjustment device 1b in the second embodiment.

First, a user inputs the evaluation function H through the input-output unit 8 at Step S201 and then inputs the initial value through the input-output unit 8 at Step S202.

At Step S201, the evaluation function H is input as the sum of the square mean of the response error for the period of T seconds as expressed by the following equation (5), where $\Delta t$ represents the sampling time of the feedback position "a".

[Equation 5]

$$H = \sum_{t=0}^{T} \frac{(b(t) - a(t))^2}{\Delta t} \quad (5)$$

At Step S202, the initial values are input as $\omega=40$, $\zeta=0.01$, $\Delta\omega=1$, and $\Delta\zeta=0.01$. In addition, n=10, i=0, and j=0 are input.

Steps S3 to S9 are identical to FIG. 7 in the first embodiment.

At Step S210, the measurement has been completed on all the parameter combinations. Therefore, the values of the evaluation function H are calculated to display the calculation results on the output device 89.

Figure 15:
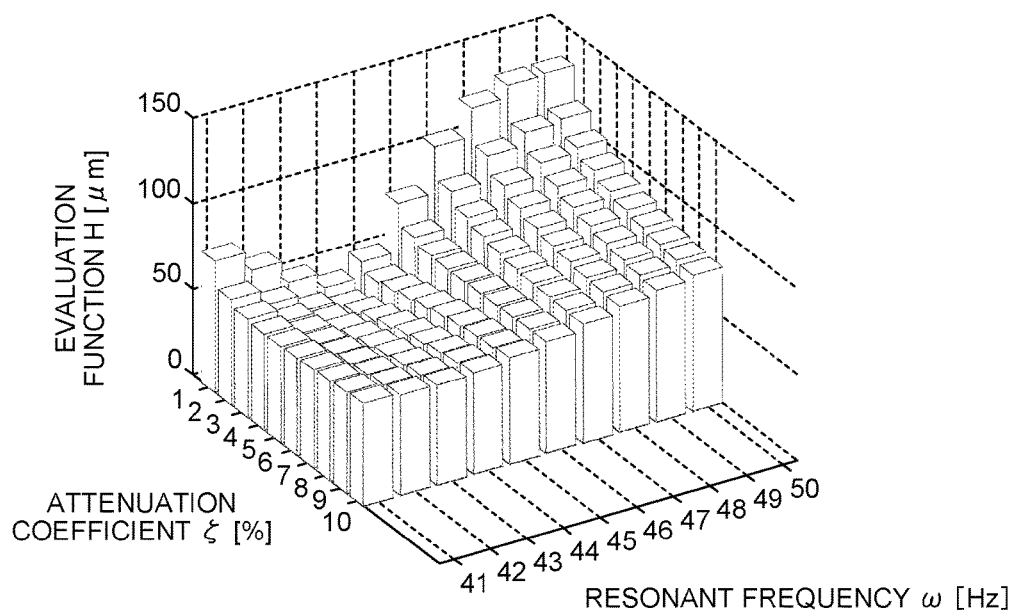
FIG. 15 is a three-dimensional bar graph illustrating the relation between the respective values of the two parameters $\omega$ and $\zeta$ and the value of the evaluation function H in the second embodiment.
Figure 16:
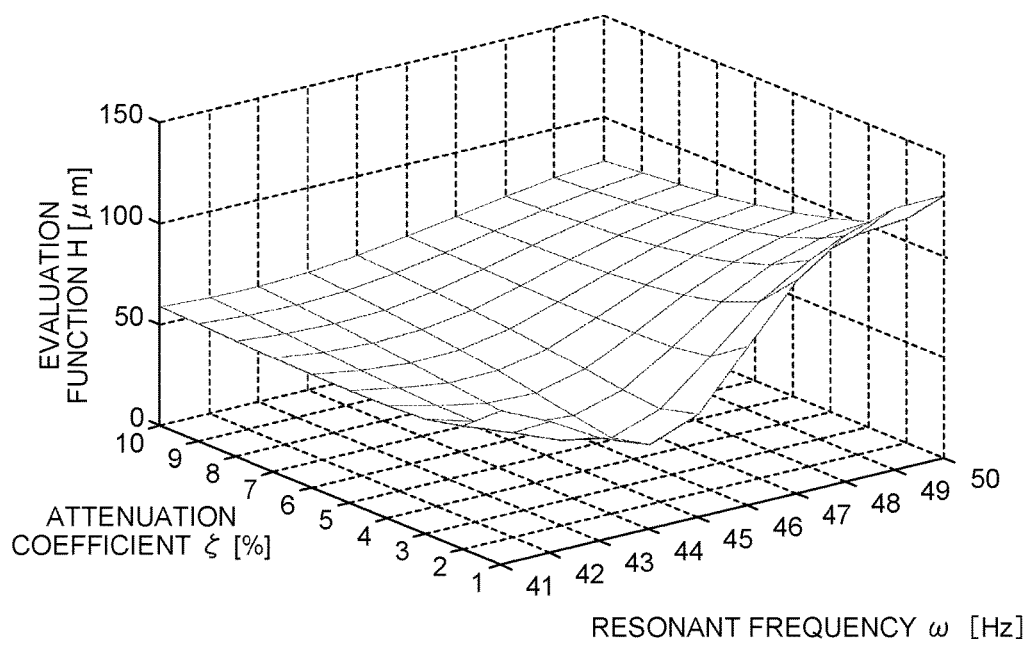
FIG. 16 is a three-dimensional mesh graph illustrating the relation between the respective values of the two parameters $\omega$ and $\zeta$ and the value of the evaluation function H in the second embodiment.

FIG. 15 is a three-dimensional bar graph illustrating the relation between the respective values of the two parameters $\omega$ and $\zeta$ and the value of the evaluation function H in the second embodiment. FIG. 16 is a three-dimensional mesh graph illustrating the relation between the respective values of the two parameters $\omega$ and $\zeta$ and the value of the evaluation function H in the second embodiment. The input-output unit 8 outputs the graph illustrated in FIG. 15 or FIG. 16 to the output device 89.

At Step S211, on the basis of the results of the evaluation function H, the user selects the most optimal parameter combination and inputs the value of $\omega$ and the value of $\zeta$ to be eventually set into the input device 88. In FIG. 15, the value of the evaluation function H is minimized by a combination of parameters where the resonant frequency is 43 Hz and the attenuation coefficient of 2%. At Step S212, the value of $\omega$ and the value of $\zeta$ that are the user input parameters are set in the correction model unit 6.

As described above, by using the control parameter adjustment device 1b according to the second embodiment, the user can determine the optimal parameter combination effectively even when the order of mechanical characteristics is different from the order of the correction model.

Third Embodiment

Figure 17:
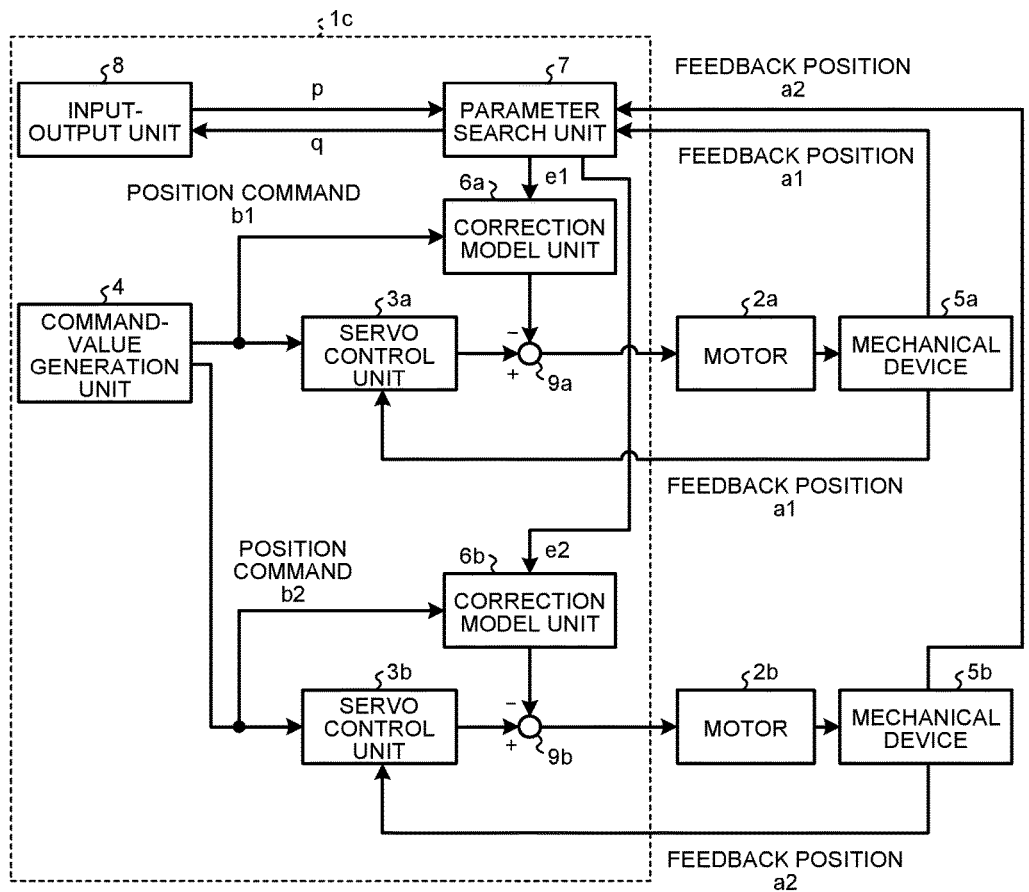
FIG. 17 is a block diagram illustrating a configuration of a control parameter adjustment device according to a third embodiment of the present invention.

FIG. 17 is a block diagram illustrating a configuration of a control parameter adjustment device 1c according to a third embodiment of the present invention. The configuration of the control parameter adjustment device 1c according to the third embodiment is different from the configuration of the control parameter adjustment device 1b according to the second embodiment in that servo control units 3a and 3b and correction model units 6a and 6b are connected to the command-value generation unit 4, and corresponding to these units, adders-subtractors 9a and 9b, motors 2a and 2b, and mechanical devices 5a and 5b are provided respectively.

The mechanical device 5 illustrated in FIG. 3 only has a single degree of flexibility in the feed direction. Therefore, in order to perform contouring motion on the plane, it is necessary to use two mechanical devices. Specifically, for two mechanical devices 5a and 5b that are perpendicular to each other, when the mechanical device 5a is given a sine-wave command, and the mechanical device 5b is given a sine-wave command with a 90-degree phase delay, which is a cosine-wave command, then the combined table motion trajectory of the mechanical devices 5a and 5b has an arc shape to perform arc motion.

Figure 18:
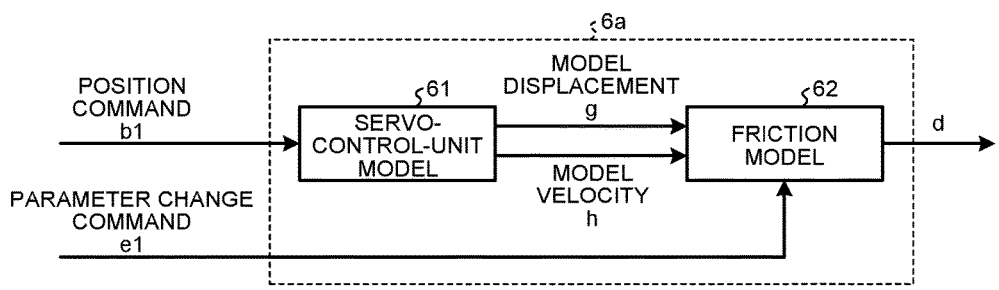
FIG. 18 is a block diagram illustrating an example configuration of a correction model unit for performing friction correction in the third embodiment.

The control parameter adjustment device 1c corrects a quadrant projection caused by the influence of a friction, and therefore it uses a friction correction model for the correction model units 6a and 6b, which is a model to express a quadrant projection. FIG. 18 is a block diagram illustrating an example configuration of the correction model unit 6a for performing friction correction in the third embodiment. The correction model unit 6a is configured by a servo-control-unit model 61 and a friction model 62. A friction torque generated in a rotary system and a friction force generated in a linear-motion system can be equivalently converted by using a rotary-to-linear motion conversion coefficient. Therefore, in the following descriptions, a friction torque and a friction force are not specifically distinguished from each other.

The servo-control-unit model 61 in the correction model unit 6a calculates an ideal servo response from a position command b1 on the assumption that no friction is present in the mechanical device 5a. An ideal model displacement "g" and model velocity "h" calculated at this time are output to the friction model 62. The friction model 62 estimates a friction force to be generated in the mechanical device 5a from the model displacement "g" and the model velocity "h". The friction model 62 also outputs the estimated friction force as the correction torque "d".

Figure 19:
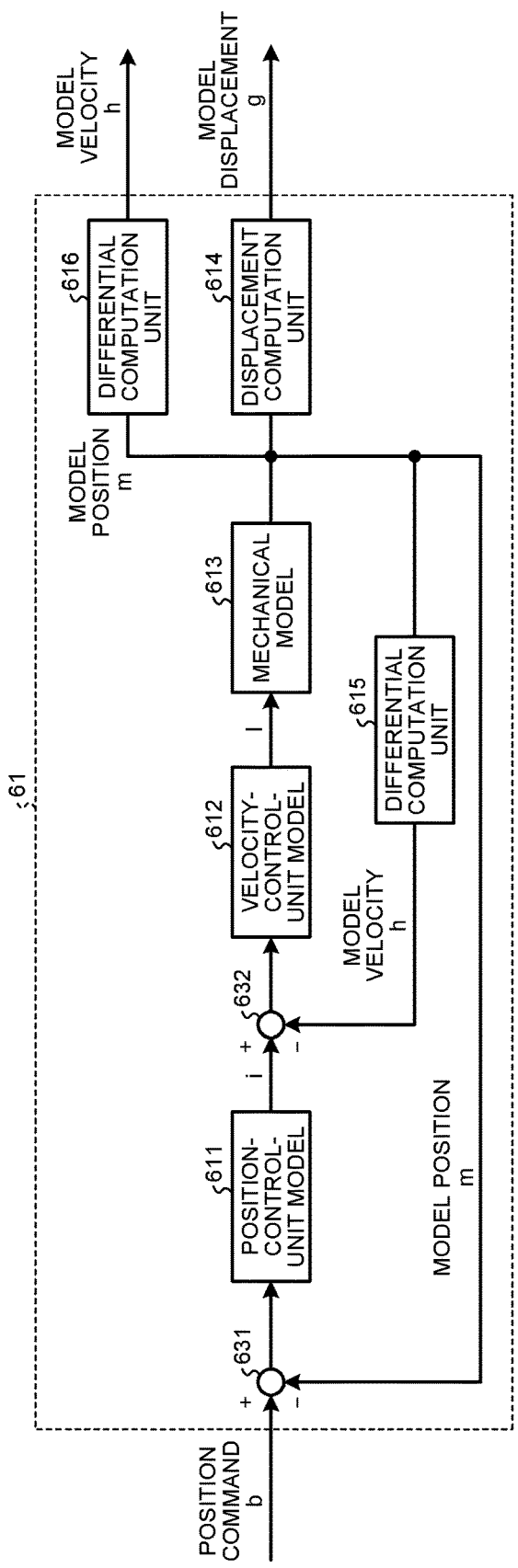
FIG. 19 is a block diagram illustrating an example configuration of a servo-control-unit model in the third embodiment.

FIG. 19 is a block diagram illustrating an example configuration of the servo-control-unit model 61 in the third embodiment. The servo-control-unit model 61 includes a position-control-unit model 611 that generates a model velocity command "i"; a velocity-control-unit model 612 that outputs a model torque command "l"; a mechanical model 613 that is a model to express mechanical characteristics; a displacement calculation unit 614 that calculates the amount of displacement; differential calculation units 615 and 616 that perform differential calculation; and adders-subtractors 631 and 632 that perform addition and subtraction.

The position-control-unit model 611 uses the same control law as the position control unit 31; generates the model velocity command "i" on the basis of an input of the difference between the position command "b" and a model position "m" calculated by the adder-subtractor 631; and then outputs the model velocity command "i" to the adder-subtractor 632. The velocity-control-unit model 612 uses the same control law as the velocity control unit 34; obtains the model torque command "l" from the difference between the model velocity command "i" and the model velocity "h" calculated by the adder-subtractor 632; and then outputs the model torque command "l" to the mechanical model 613. The mechanical model 613 is a model to express characteristics of the mechanical device 5a from a torque command for a feedback position a1. Specifically, the mechanical model 613 is the second-order integration of the inverse of a load inertia J to be applied to the motor 2a, which is expressed as the following equation (6).

[Equation 6]

$$\frac{1}{Js^2} \tag{6}$$

The mechanical model 613 uses the model torque command "l" to calculate the model position "m". Each of the differential calculation units 615 and 616 differentiates the model position "m" so as to obtain and output the model velocity "h". On the basis of an input of the model position "m", the displacement calculation unit 614 calculates the amount of displacement from the position where the motion direction is reversed, and then it outputs the model displacement "g".

As described above, from the position command "b", the servo-control-unit model 61 calculates and outputs the ideal model displacement "g" and model velocity "h" which are in the assumption that no friction is present in the mechanical device 5a.

Figure 20:
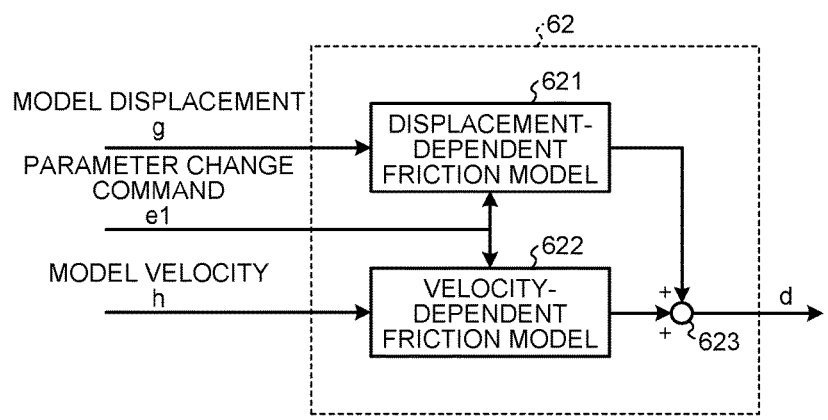
FIG. 20 is a block diagram illustrating a detailed configuration of a friction model in the third embodiment.

FIG. 20 is a block diagram illustrating a detailed configuration of the friction model 62 in the third embodiment. The friction model 62 is configured by a displacement-dependent friction model 621 that calculates a friction component that is dependent on a displacement; a velocity-dependent friction model 622 that calculates a friction component that is dependent on a velocity; and an adder 623 that performs addition. A specific example of the displacement-dependent friction model 621 is a Coulomb friction model. A specific example of the velocity-dependent friction model 622 is a viscous friction model.

On the basis of an input of the model displacement "g", the displacement-dependent friction model 621 calculates and outputs a friction component that is dependent on a displacement which is equivalent to a Coulomb friction. On the basis of an input of the model velocity "h", the velocity-dependent friction model 622 calculates a friction component which is equivalent to a viscous friction. The adder 623 outputs the sum of the friction component that is dependent on a displacement and the friction component that is dependent on a velocity as the correction torque "d".

Specifically, the displacement-dependent friction model 621 is a Coulomb friction model expressed as the following equation (7), where "k" represents an elastic modulus, and "$g_{max}$" represents a Coulomb-friction shifting displacement that is the amount of displacement required to shift to the Coulomb friction.

[Equation 7]

$$f(g) = \begin{cases} k \cdot g & (\text{if } g < g_{max}) \\ k \cdot g_{max} & (\text{if } g \geq g_{max}) \end{cases} \tag{7}$$

Specifically, the velocity-dependent friction model 622 is a proportional viscous friction model expressed as the following equation (8), where "c" represents a viscosity coefficient.

[Equation 8]

$$f(h) = c \cdot h \tag{8}$$

Parameter adjustment by using the control parameter adjustment device 1c is described. In this example, it is assumed that a displacement-dependent friction force is only a friction force to be generated in the mechanical devices 5a and 5b. On this assumption, the viscosity coefficient "c" is equal to 0 (c=0).

Figure 21:
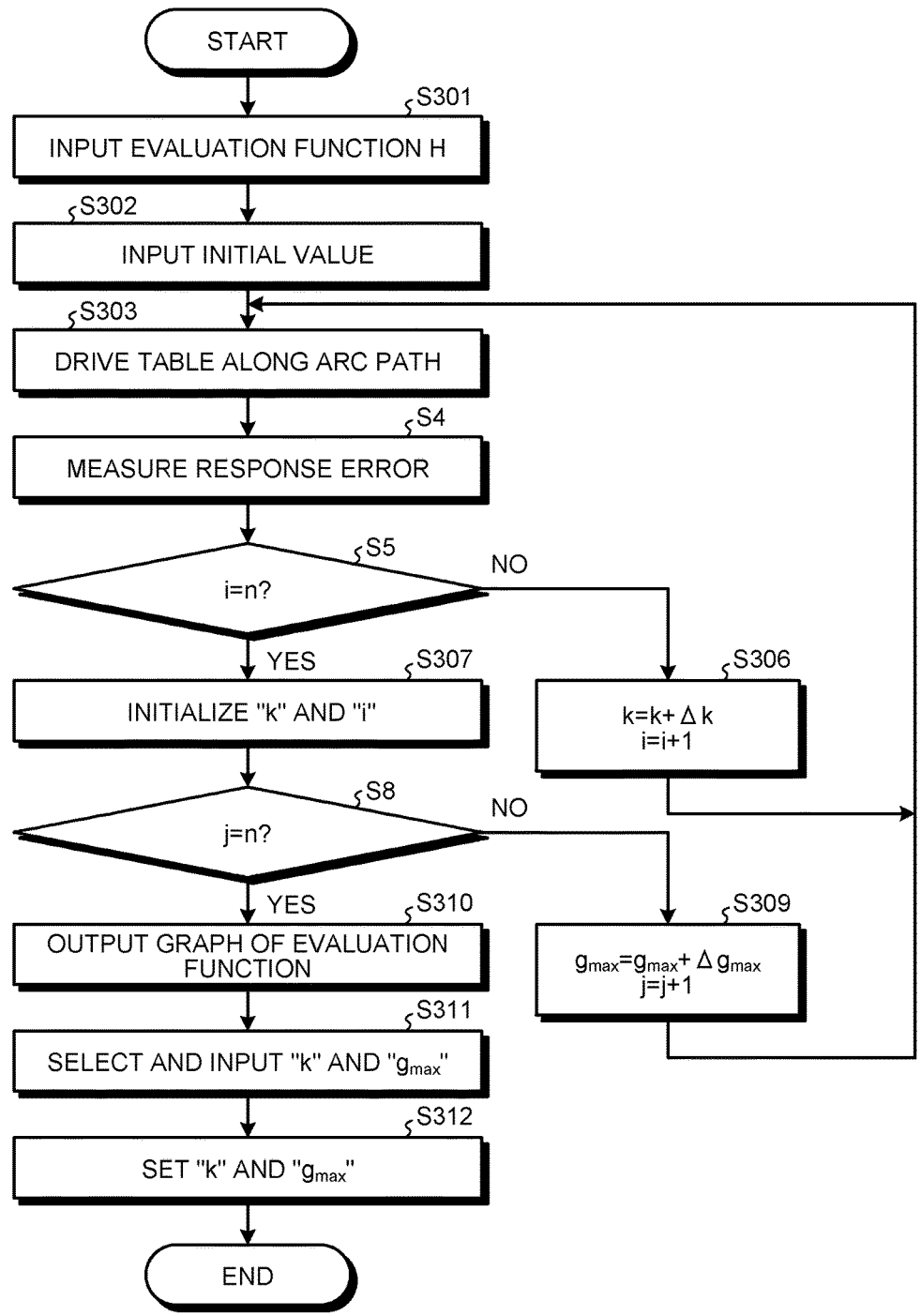
FIG. 21 is a flowchart illustrating a control parameter adjustment procedure using the control parameter adjustment device according to the third embodiment.

FIG. 21 is a flowchart illustrating a control parameter adjustment procedure using the control parameter adjustment device 1c according to the third embodiment. Described are the differences from the flowchart of the control parameter adjustment procedure in the control parameter adjustment device 1b illustrated in FIG. 14.

In FIG. 21, search parameters are changed to the elastic modulus "k" and the Coulomb-friction shifting displacement "$g_{max}$". The number of parameter changes in the elastic modulus "k" is represented as "i". The number of parameter changes in the Coulomb-friction shifting displacement "$g_{max}$" is represented as "j". At Step S301, the amount of quadrant projection is defined as the evaluation function H so as to be input, which is different from Step S201. The search parameters have been changed to "k" and "$g_{max}$". Therefore, at Step S302, in addition to the initial value of these parameters "k" and "$g_{max}$" different from Step S202, an allowable value H0 of the evaluation function is also set. At Step S303, different from Step S3, the mechanical devices 5a and 5b are driven along an arc trajectory. At Step S310, not only the graph of the evaluation function is output but also the motion trajectories, on which the evaluation function is equal to or less than the set allowable value H0, are all drawn and superimposed, and are displayed on the output device 89. Further, in FIG. 21, because the search parameters are "k" and "$g_{max}$", different from Step S7, the parameter "k" is initialized at Step S307. Furthermore, different from Step S6, k=k+Δk is set at Step S306. At Step S309, different from Step S9, $g_{max}=g_{max}+\Delta g_{max}$ is set.

At Step S301, as expressed by the following equation (9), the difference between the maximum and minimum values of the amount of quadrant projection is set as the evaluation function H. Here, "x" represents the feedback position a1 of the mechanical device 5a, and "y" represents a feedback position a2 of the mechanical device 5b.

[Equation 9]

$$H=\max(\sqrt{x(t)^2+y(t)^2})-\min(\sqrt{x(t)^2+y(t)^2}) \quad (9)$$

At Step S302, the initial value of search parameters and the allowable value H0 of the evaluation function are set. Because the search parameters are "k" and "$g_{max}$" the respective initial values of "k" and "$g_{max}$" "Δk", and "$\Delta g_{max}$" are input. In addition, n=10, i=0, and j=0 are input. Further, the allowable value H0 of the evaluation function is set to 3 μm.

At Step S310, the evaluation function H is calculated and the graph of the evaluation function H is output.

Figure 22:
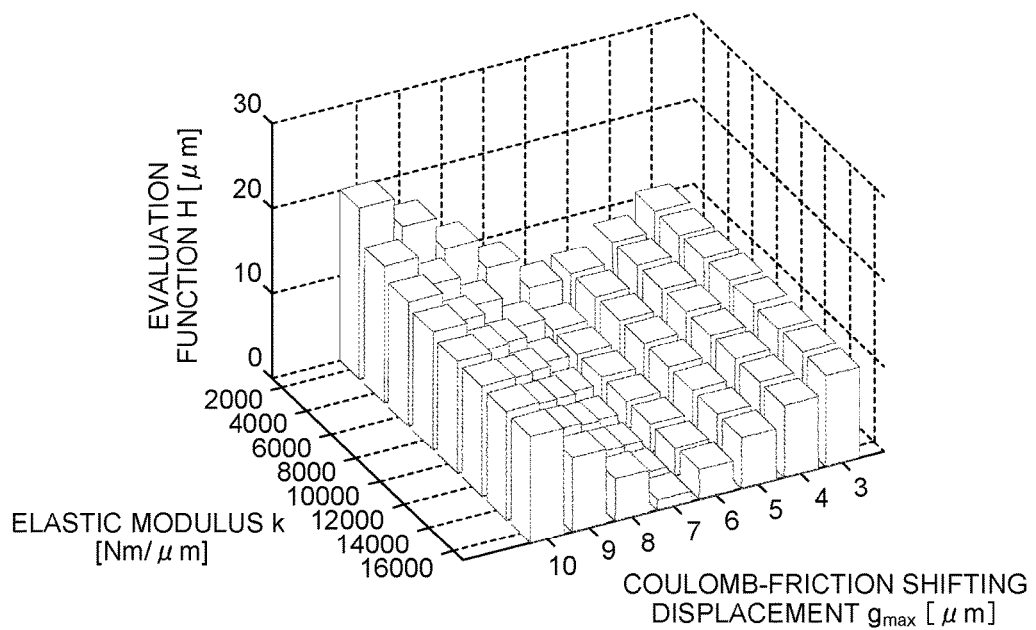
FIG. 22 is a three-dimensional bar graph illustrating the relation between the respective values of two parameters "k" and "$g_{max}$" and the value of the evaluation function H in the third embodiment.
Figure 23:
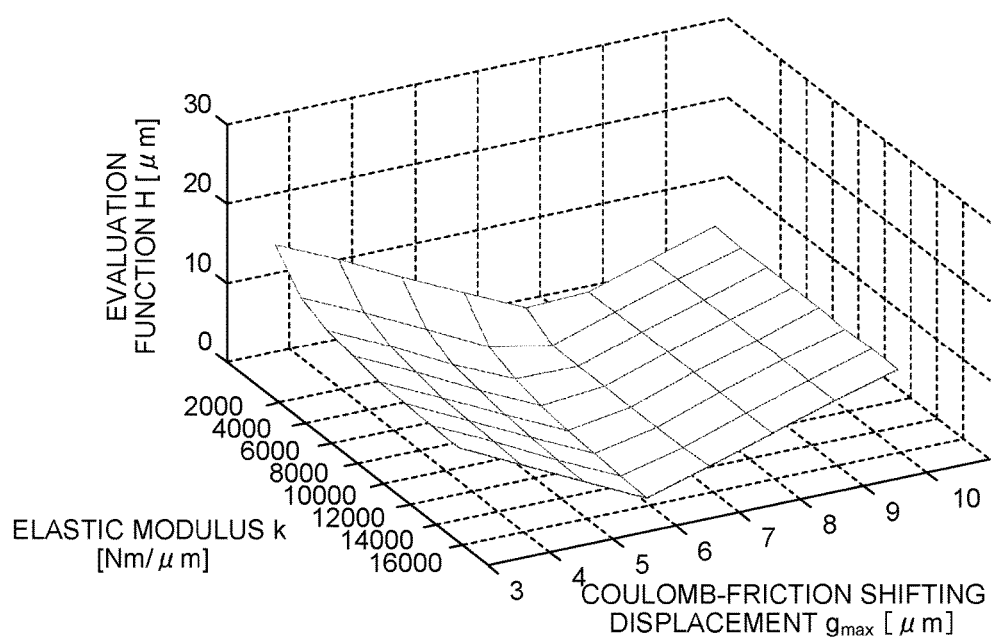
FIG. 23 is a three-dimensional mesh graph illustrating the relation between the respective values of the two parameters "k" and "$g_{max}$" and the value of the evaluation function H in the third embodiment.

FIG. 22 is a three-dimensional bar graph illustrating the relation between the respective values of the two parameters "k" and "$g_{max}$" and the value of the evaluation function H in the third embodiment. FIG. 23 is a three-dimensional mesh graph illustrating the relation between the respective values of the two parameters "k" and "$g_{max}$" and the value of the evaluation function H in the third embodiment. The input-output unit 8 outputs the graph, illustrated in FIG. 22 or FIG. 23, to the output device 89.

Figure 24:
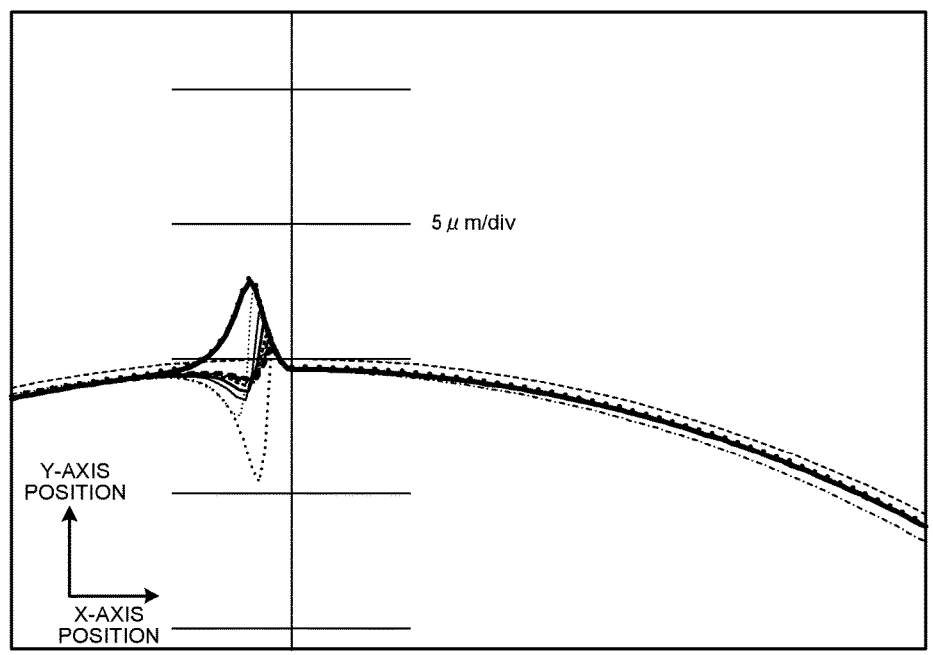
FIG. 24 is an enlarged diagram of motion trajectories at a position where the quadrant is changed over to another quadrant, displayed on an output device in the third embodiment.

As illustrated in FIGS. 22 and 23, there are a plurality of different parameter combinations by which the evaluation function H is equal to or less than the allowable value H0. However, due to the influence of a friction modeling error, there are no parameter combinations that give perfect circle. Therefore, it is considered that the shape of a quadrant projection differs depending on the parameter combination. It is difficult for a user to select optimal parameters by using only the three-dimensional graph illustrating the evaluation function H. Accordingly, at Step S310, the control parameter adjustment device 1c draws and superimposes all the motion trajectories, each of the all corresponds to a combination of parameter values by which the evaluation function is equal to or less than the set allowable value H0, and then it displays these motion trajectories on the output device 89 as illustrated in FIG. 24. At this time, it is possible that a combination of parameter values, by which the evaluation function is equal to or less than the allowable value H0, is also displayed on the output device 89 corresponding to the motion trajectory.

FIG. 24 is an enlarged diagram of motion trajectories at a position where the quadrant is changed over to another quadrant, which are displayed on the output device 89 in the third embodiment. In FIG. 24, the horizontal axis represents the X-axis position, and the vertical axis represents the Y-axis position. "5 μm/div" shows the vertical-axis scale division of 5 μm. As illustrated in FIG. 24, the shape of the quadrant projection differs depending on the combination of parameters, while the allowable value of the evaluation function is identical. At this time, according to the machining conditions, different specifications are required for the shape of the projection that remains uncorrected. Specifically, in outer-diameter machining, when the shape of a quadrant projection is directed inward from the reference circle, there is a possibility for a scratch to be undesirably formed on the machined surface. On the other hand, in the case of inner-diameter machining, when a projection extends outward from the reference circle, there is a possibility that a scratch is generated. Further, in machining in which the higher priority is put on the roundness, it is preferable that the evaluation function value is minimized as a condition.

When the evaluation function H is input, it is possible to select and determine the function according to the required specifications. However, there is a problem that a considerable amount of time is required to design the evaluation function H that precisely corresponds to the required trajectory shape.

Therefore, at Step S311, in the control parameter adjustment device 1c, among the motion trajectories displayed on the output device 89, a user selects respective values of the parameters "k" and "$g_{max}$" that correspond to the motion trajectory with the most preferable shape and inputs these values to the input device 88 in order to select a preferable waveform. That is, the input device 88 receives a parameter combination selected by a user from among a plurality of different parameter combinations by which the evaluation function is equal to or less than the allowable value H0.

At Step S312, the parameter search unit 7 outputs parameter change commands e1 and e2 for instructing a combination of the values of the parameters "k" and "$g_{max}$" that correspond to the waveform selected at Step S311 to the correction model units 6a and 6b, respectively. The parameter change command e1 is eventually input to the displacement-dependent friction model 621 in FIG. 20.

As described above, the control parameter adjustment device 1c according to the third embodiment is used to search for a parameter of a quadrant projection caused by a friction. Therefore, the quadrant projection can be minimized. Further, a parameter that is predominantly effective for each arc-motion pattern can be adjusted. Accordingly, a control parameter that satisfies the required motion-trajectory shape can be searched efficiently with high accuracy.

Fourth Embodiment

The configuration of a control parameter adjustment device in a fourth embodiment is identical to the configuration of the control parameter adjustment device 1c according to the third embodiment.

In the fourth embodiment, it is assumed that there are two types of friction forces to be generated in the mechanical devices 5a and 5b, which are a displacement-dependent friction and a velocity-dependent friction. On this assumption, there are three parameters to be adjusted, which are the elastic modulus "k", the Coulomb-friction shifting displacement amount "$g_{max}$", and the viscous coefficient "c".

Figure 25:
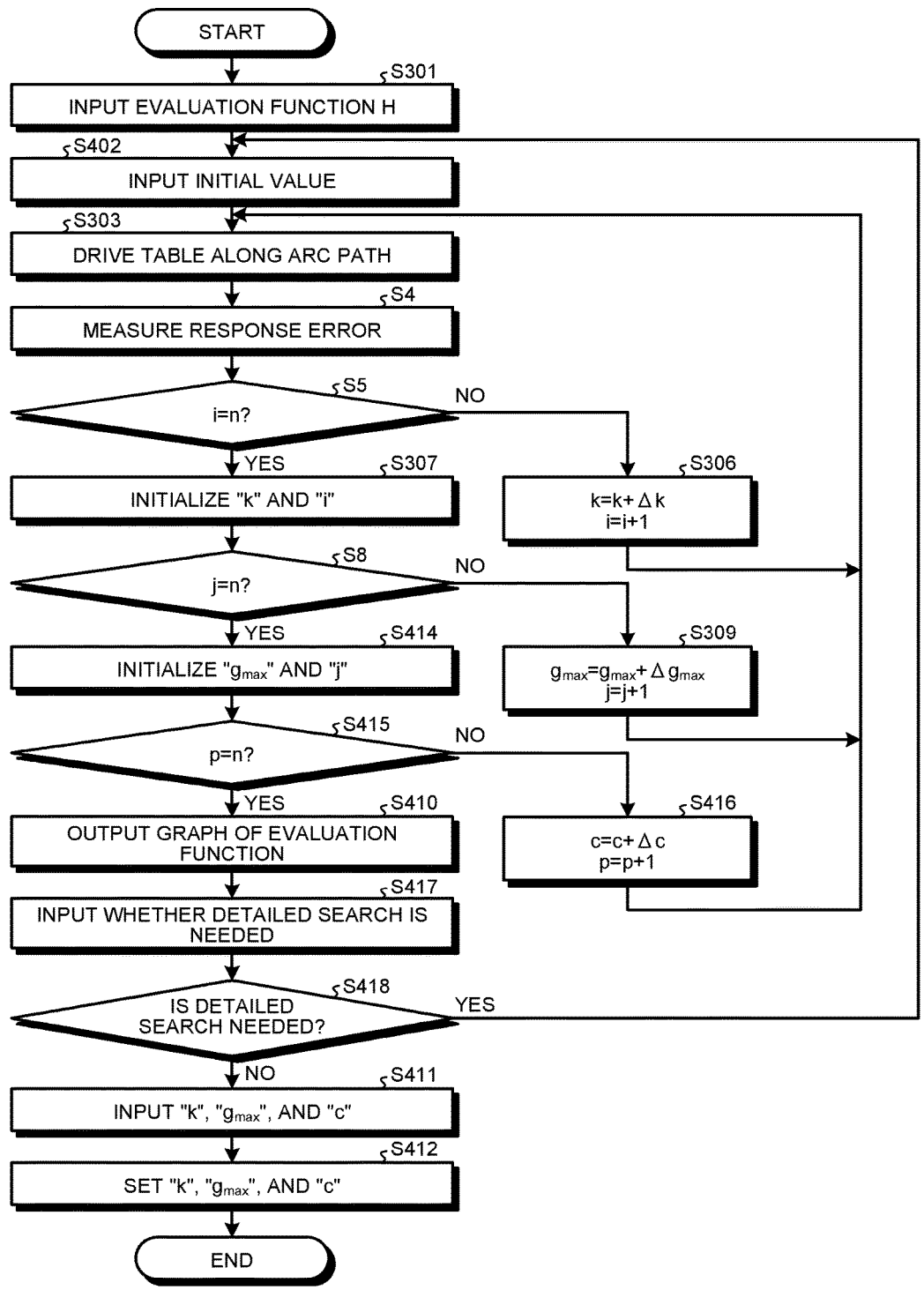
FIG. 25 is a flowchart illustrating a control parameter adjustment procedure in a fourth embodiment of the present invention.
Figure 26:
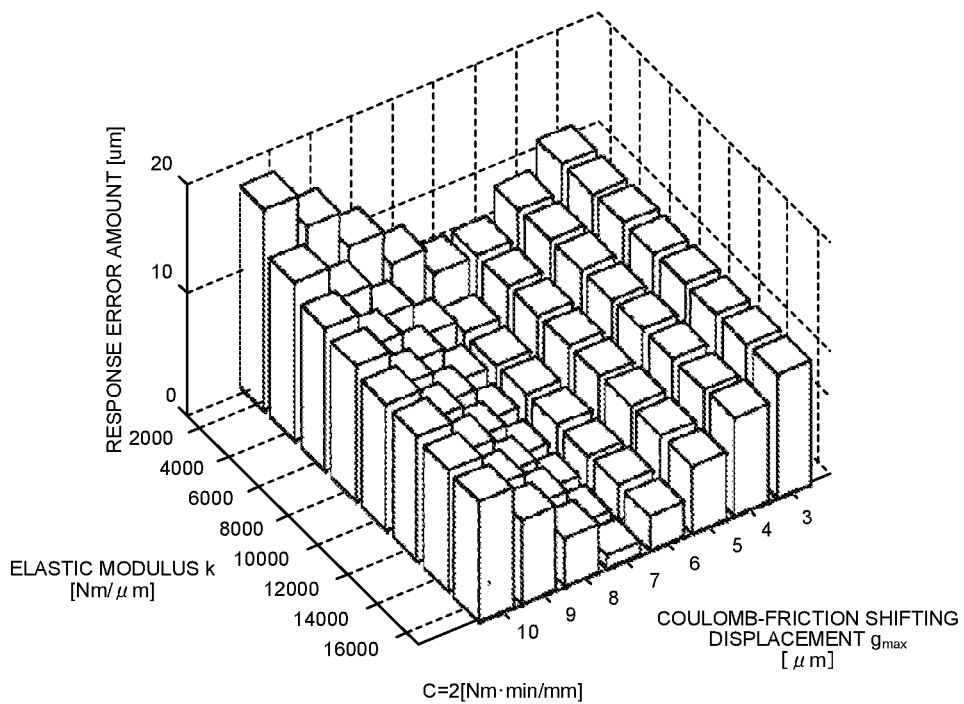
FIG. 26 is a three-dimensional bar graph in a control parameter adjustment device according to the fourth embodiment, which uses one parameter "c" as an intervening variable to illustrate the relation between the respective values of two remaining parameters "k" and "$g_{max}$" and the value of the evaluation function H.
Figure 27:
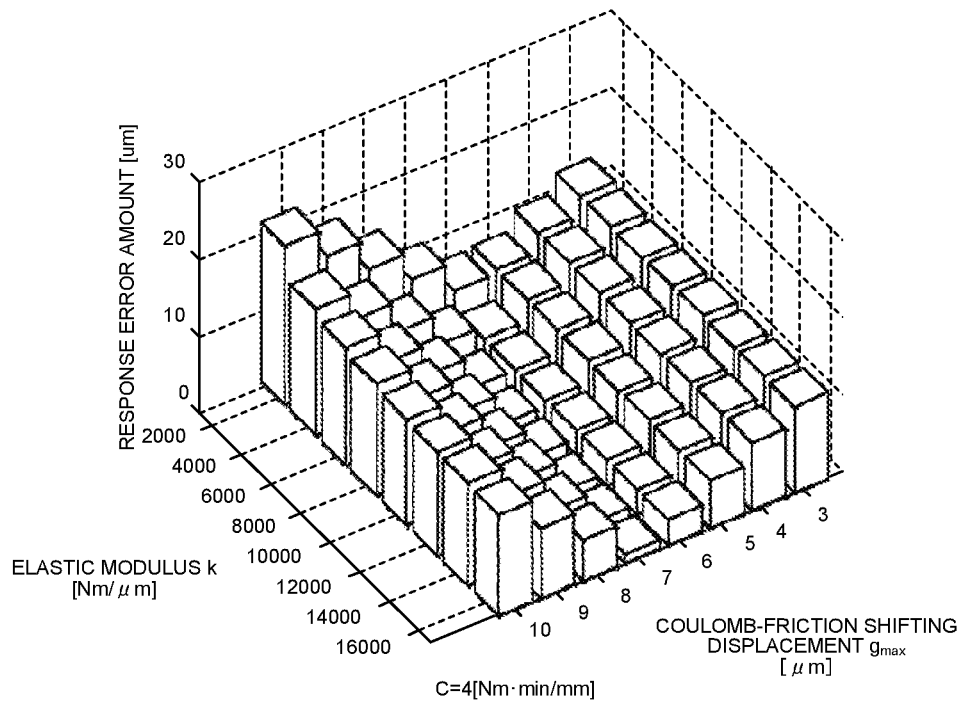
FIG. 27 is a three-dimensional bar graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 28:
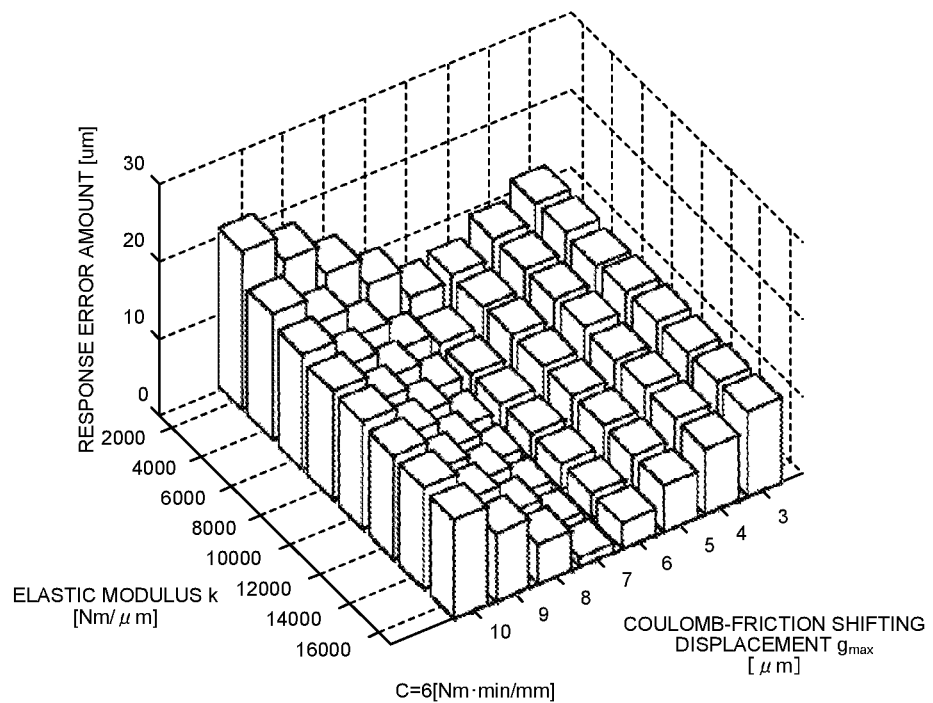
FIG. 28 is a three-dimensional bar graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 29:
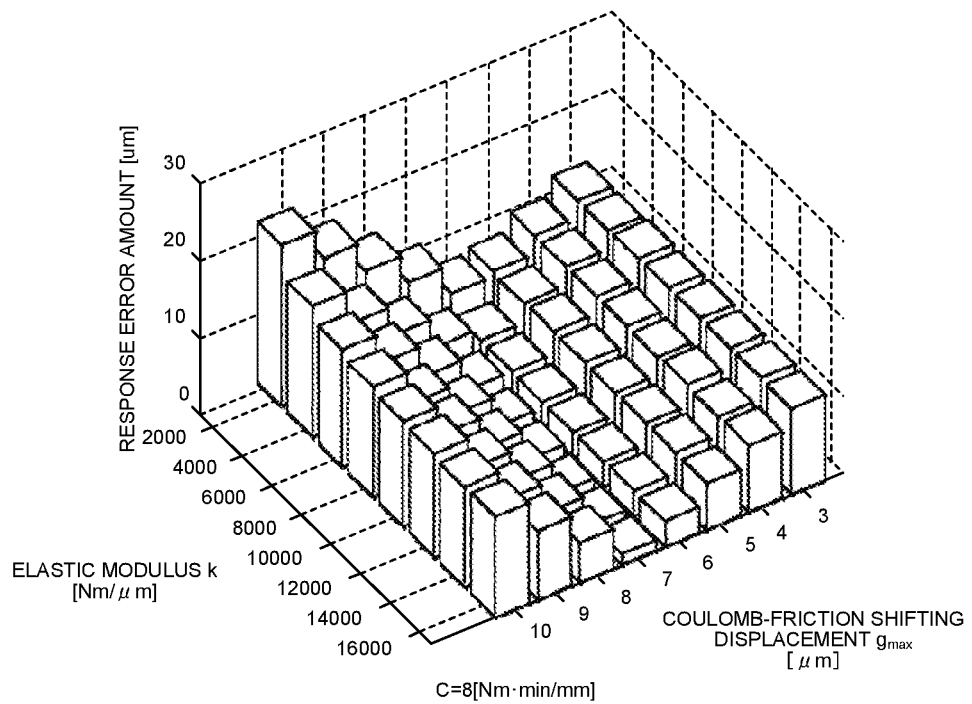
FIG. 29 is a three-dimensional bar graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 30:
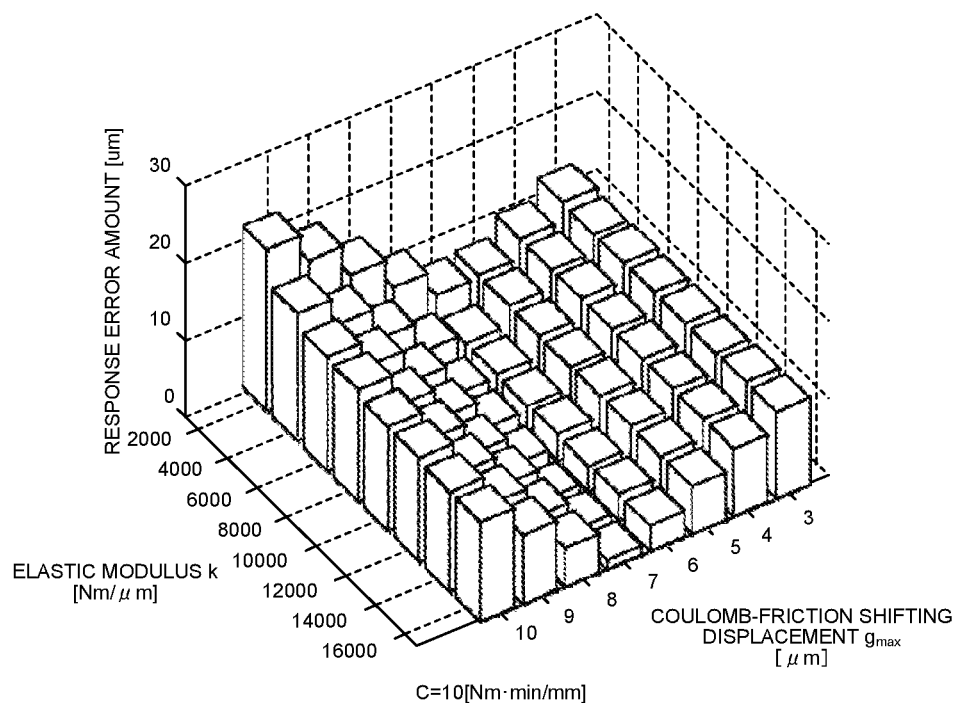
FIG. 30 is a three-dimensional bar graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 31:
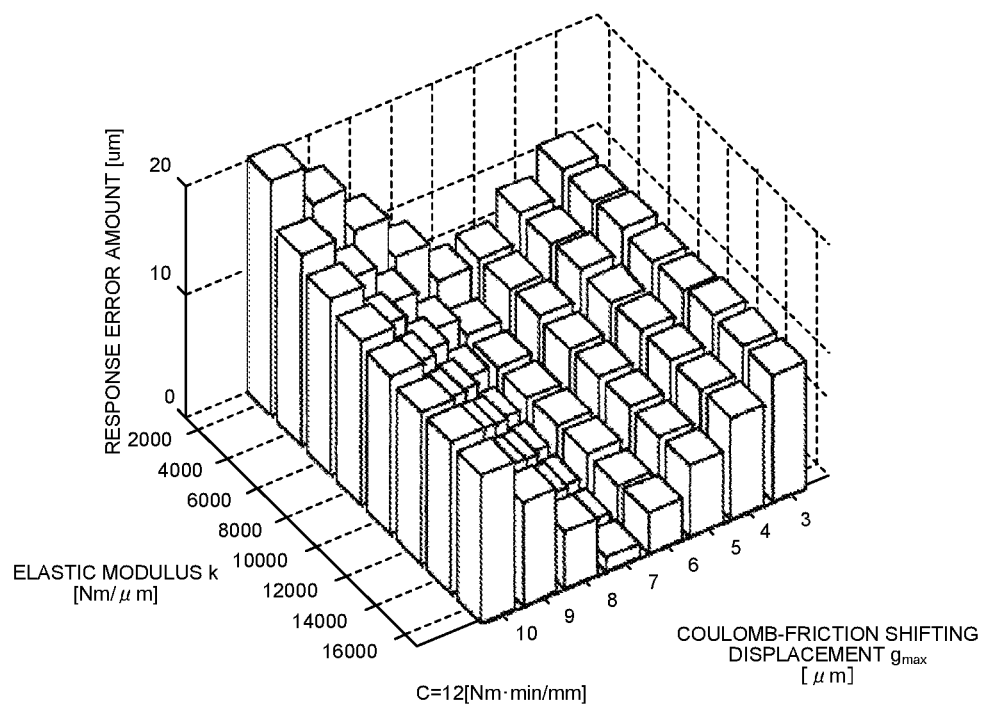
FIG. 31 is a three-dimensional bar graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 32:
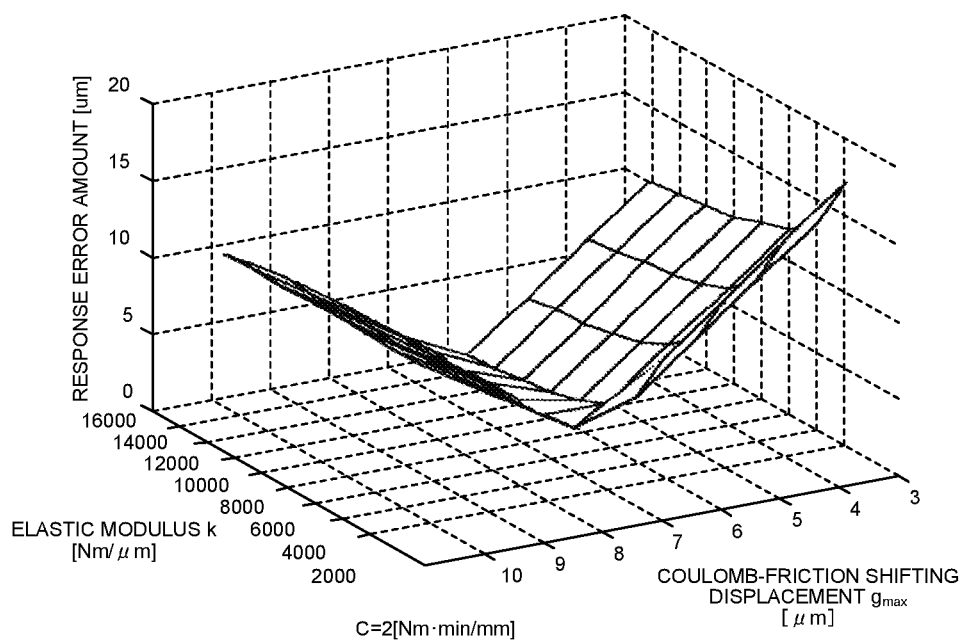
FIG. 32 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 33:
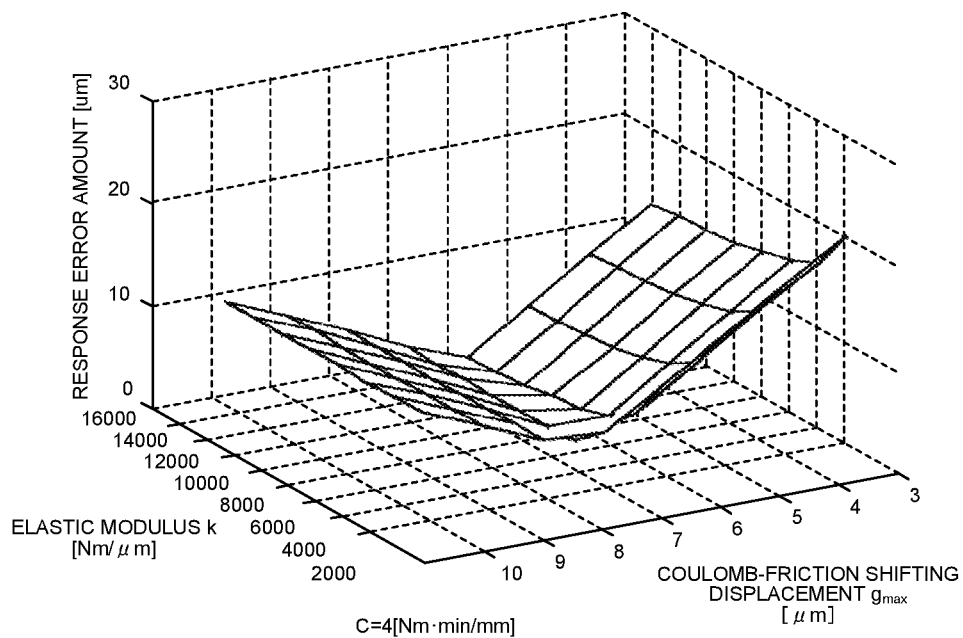
FIG. 33 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 34:
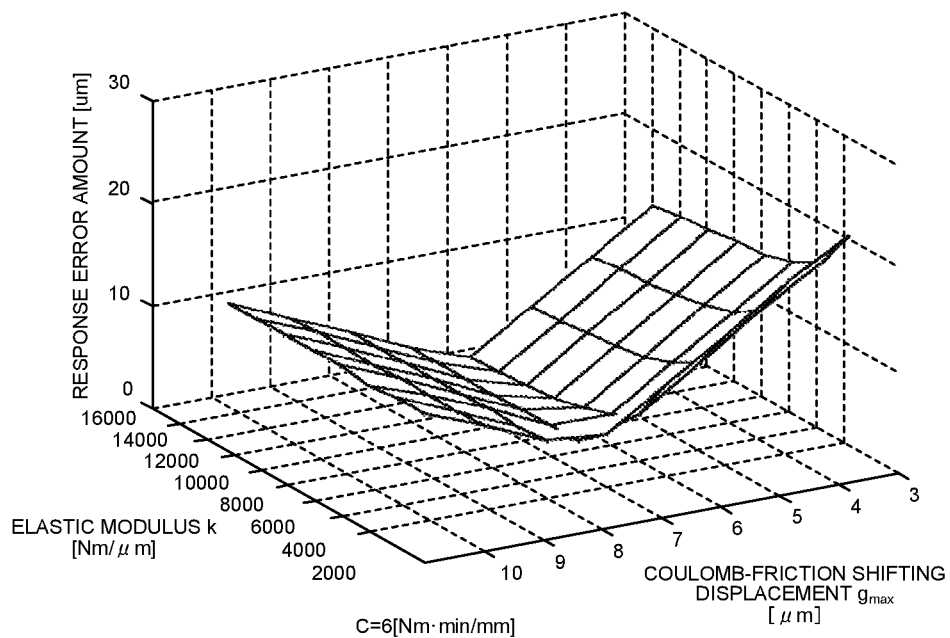
FIG. 34 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 35:
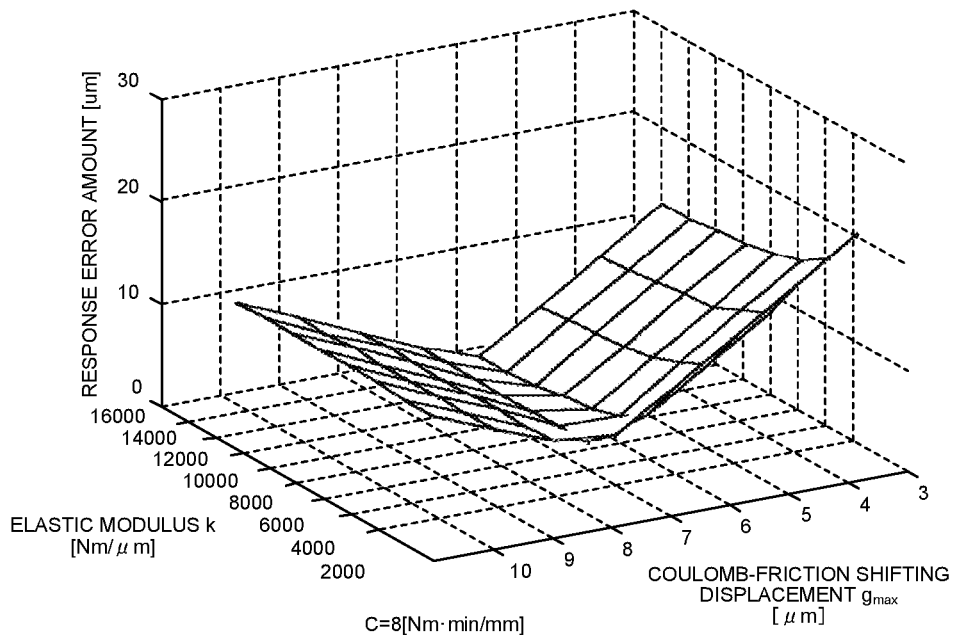
FIG. 35 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 36:
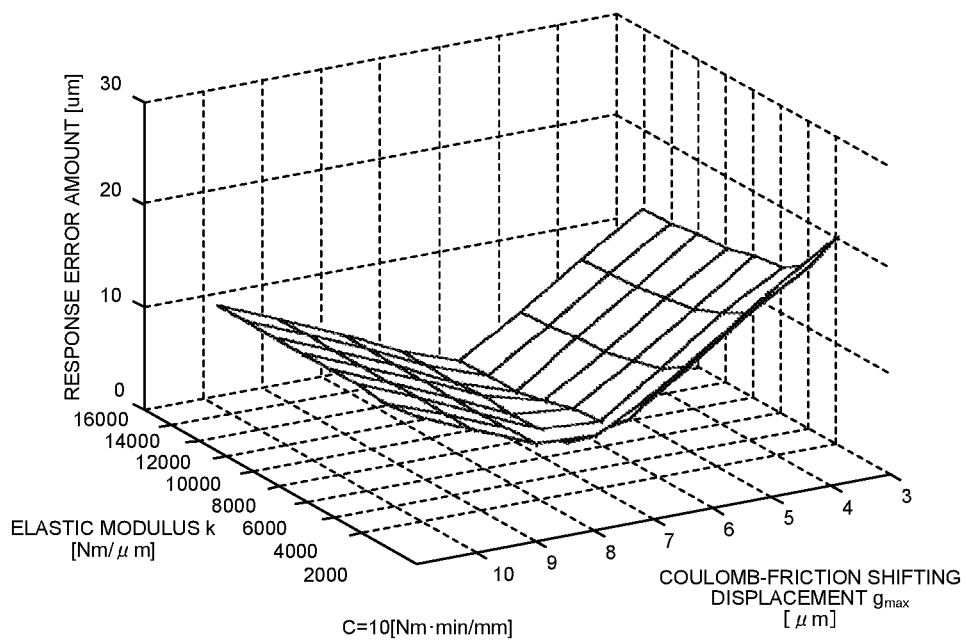
FIG. 36 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.
Figure 37:
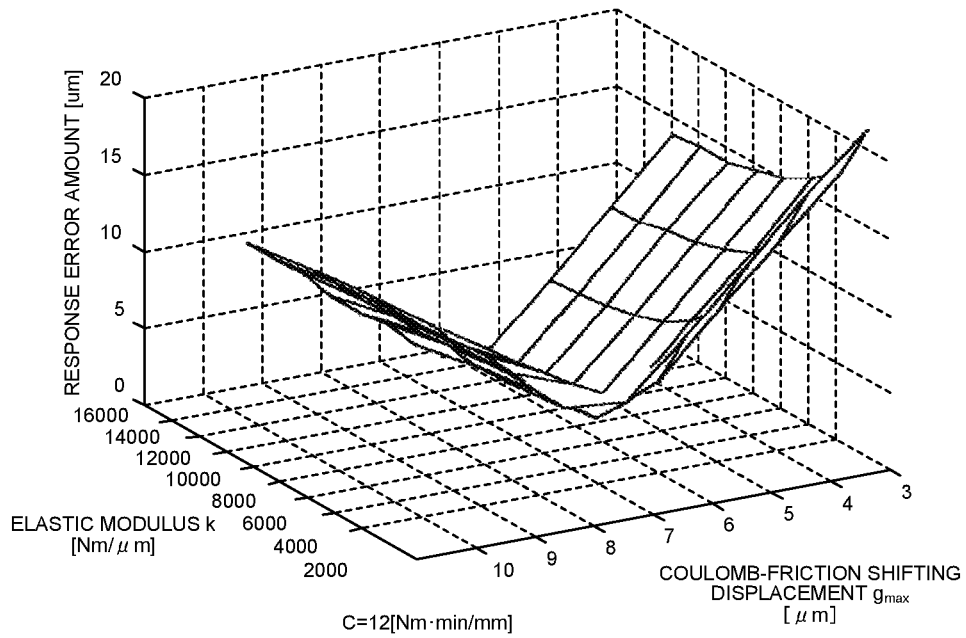
FIG. 37 is a three-dimensional mesh graph in the control parameter adjustment device according to the fourth embodiment, which uses one parameter "c" as an intervening variable to illustrate the relation between the respective values of the two remaining parameters "k" and "$g_{max}$" and the value of the evaluation function H.

FIG. 25 is a flowchart illustrating a control parameter adjustment procedure in the fourth embodiment of the present invention. Described below are the differences between the flowchart in FIG. 25 and the flowchart of the control parameter adjustment procedure in the third embodiment illustrated in FIG. 21.

At Step S402, in addition to the process at Step S302, the initial value of the viscous coefficient "c" and Δc are further set, and the number of parameter changes "p" in the viscous coefficient "c" is initialized to p=0. In FIG. 25, Step S414 is added to FIG. 21, at which "$g_{max}$" and "j" are initialized. In FIG. 25, Step S415 is added to FIG. 21, at which whether the number of parameter changes "p" in the viscous coefficient "c" is equal to "n" (p=n) is determined. When "p" is less than "n", (NO at Step S415), the value of "c" and the value of "p" are changed to c=c+Δc and p=p+1, respectively, at Step S416. The process flow then returns to Step S303 to repeat the measurement. When p=n (YES at Step S415), the process flow advances to Step S410. Step S410 is different from Step S310 in that there are three parameters, and therefore one of the parameters is used as an intervening variable to draw a plurality of three-dimensional graphs of the evaluation function to each value of the two remaining parameters. Further, in FIG. 25, Step S417 is added to FIG. 21, at which a user inputs whether a detailed search is needed. In FIG. 25, Step S418 is added to FIG. 21, at which whether a detailed search is needed is determined. When a detailed search is needed (YES at Step S418), the process flow returns to Step S402 to input a new condition of the detailed search for a parameter. When a detailed search is not needed (NO at Step S418), the process flow advances to Step S411.

At Step S411, in addition to the parameters "k" and "$g_{max}$", the value of "c" is also selected and input to the input device 88 to select a preferable waveform.

At Step S412, the parameter search unit 7 outputs the parameter change commands e1 and e2 for instructing a combination of the values of the parameters "k", "$g_{max}$", and "c" that correspond to the waveform selected at Step S411 to the correction model units 6a and 6b, respectively. The parameter change command e1 is eventually input to the displacement-dependent friction model 621 and the velocity-dependent friction model 622 in FIG. 20.

In the case of searching for three parameters, when the search is performed n-times on all the set conditions, it is necessary to perform the measurement for $n^3$-times of driving. Therefore, there is a problem that when a large value is set as "n" a considerable amount of time is required. For example, when n=10, the measurement is needed to be performed 1000 times. On the other hand, when a small value is set as "n", it may be difficult to reach a parameter that falls within the target tolerance.

The control parameter adjustment device 1c according to the fourth embodiment displays a result of a search performed once on the output device 89 at Step S410. At this time, when three or more parameters are adjusted, they cannot be expressed in a three-dimensional graph. Therefore, any one of the parameters is used as an intervening variable to draw a plurality of three-dimensional graphs of the evaluation function to each value of the two remaining parameters, and then it displays the three-dimensional graphs on the output device 89.

FIGS. 26 to 31 are three-dimensional bar graphs in the control parameter adjustment device 1c according to the fourth embodiment, each of which uses one parameter "c" as an intervening variable to illustrate the relation between the respective values of the two remaining parameters "k" and "$g_{max}$" and the value of the evaluation function H. FIGS. 26 to 31 respectively correspond to the cases where "c" is set to 2, 4, 6, 8, 10, and 12 [Nm·min/mm]. FIGS. 32 to 37 are three-dimensional mesh graphs in the control parameter adjustment device 1c according to the fourth embodiment, each of which uses one parameter "c" as an intervening variable to illustrate the relation between the respective values of the two remaining parameters "k" and "$g_{max}$" and the value of the evaluation function H. FIGS. 32 to 37 respectively correspond to the cases where "c" is set to 2, 4, 6, 8, 10, and 12 [Nm·min/mm]. The input-output unit 8 outputs the graphs illustrated in FIGS. 26 to 31 or in FIGS. 32 to 37 to the output device 89. The display using a plurality of three-dimensional graphs as described above is made possible also for four or more types of parameters by displaying a plurality of three-dimensional graphs, each of which illustrates the relation between two parameters and the value of the evaluation function H, which corresponds to combinations of different values of the remaining parameters.

At this time, the user determines whether a parameter-search result output to the output device 89 satisfies the required specifications. When the parameter-search result does not satisfy the required specifications, the user inputs the need for a detailed search at Step S417. The user also determines a detailed-search area on the basis of the graphs illustrated at Step S410.

With this operation, the process flow branches to YES at Step S418, and then shifts to Step S402 again to change the initial value for the search to instruct a detailed search. By repeating the operation as described above, it is possible for the user to arrive at a parameter that satisfies the requirements in a reduced period of time.

As described above, by using the control parameter adjustment device 1c according to the fourth embodiment, even in a parameter search for a model made up of three or more parameters, the user can still arrive at a parameter that satisfies the allowable value H0 of the evaluation function effectively in a reduced period of time.

Fifth Embodiment

The configuration of a parameter adjustment device in a fifth embodiment is identical to the configuration of the control parameter adjustment device 1c according to the third embodiment.

Figure 38:
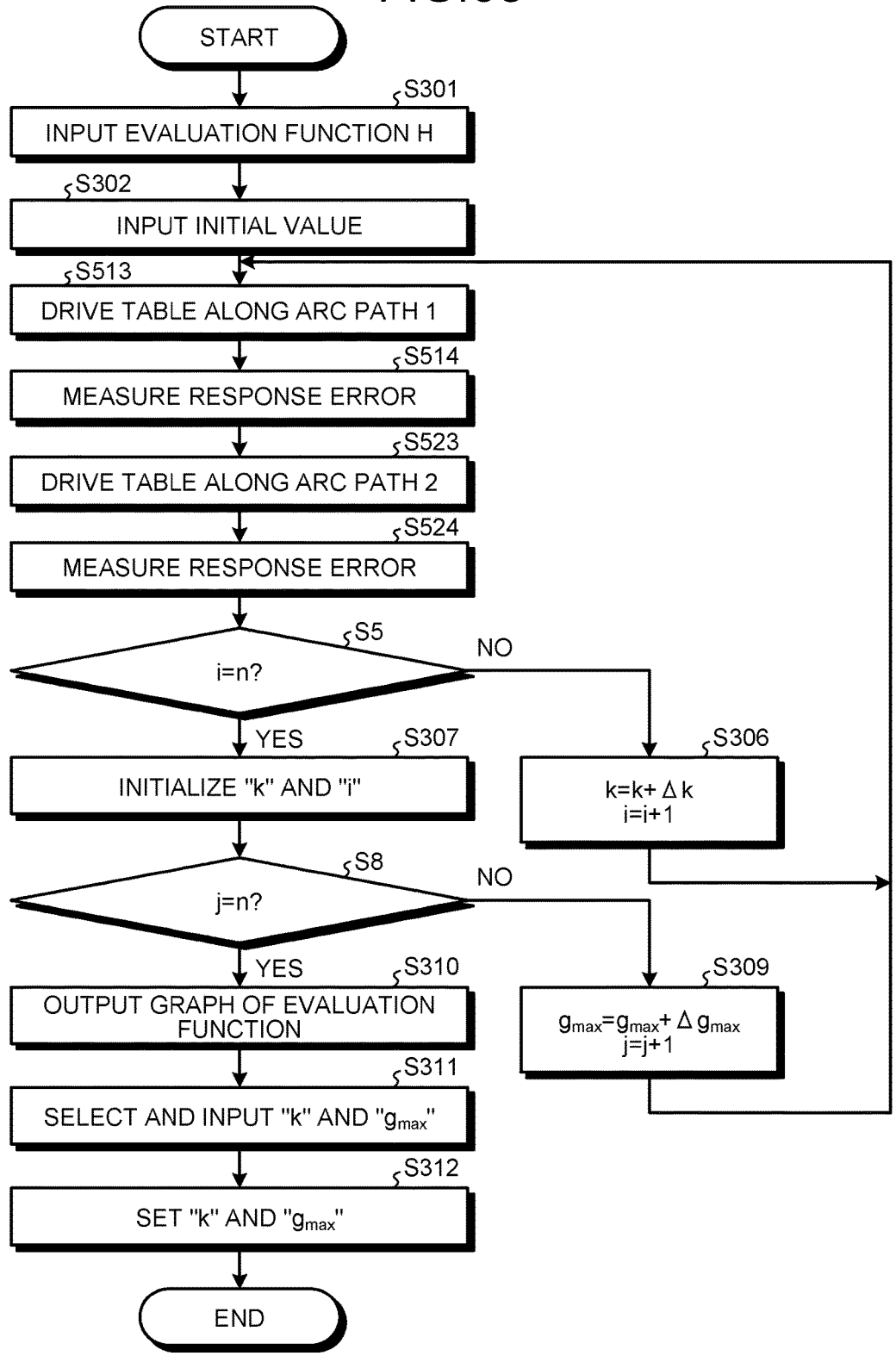
FIG. 38 is a flowchart illustrating a control parameter adjustment procedure in a fifth embodiment of the present invention.

FIG. 38 is a flowchart illustrating the control parameter adjustment procedure in the fifth embodiment of the present invention. Described below are the differences between the flowchart in FIG. 38 and the flowchart of the control parameter adjustment procedure in the third embodiment illustrated in FIG. 21.

Steps S303 and S4 in FIG. 21 are changed to Steps S513, S514, S523, and S524 in FIG. 38. The table 84 is driven on two different arc motion conditions, and the respective response errors are measured.

Specifically, at Step S513, the table 84 is driven along an arc trajectory 1 that corresponds to an arc condition 1, and a response error obtained at that time is measured at Step S514. Further, at Step S523, the table 84 is driven along an arc trajectory 2 that corresponds to an arc condition 2, and a response error obtained at that time is measured at Step S524.

When the mechanical devices 5a and 5b are driven with different arc radii at different feed velocities, the friction characteristics are changed, and the shape of a quadrant projection may be changed. In such a case, it is necessary to measure a response error on different arc motion conditions, and then to determine a parameter.

At Step S310 in FIG. 38, the evaluation functions, which are measured respectively on two different types of arc conditions, are drawn on separate graphs, and the graphs are displayed on the output device 89. The arc condition 1 described above is the radius of 10 mm and the feed velocity of 800 mm/min. The arc condition 2 described above is the radius of 20 mm and the feed velocity of 3000 mm/min.

Figure 39:
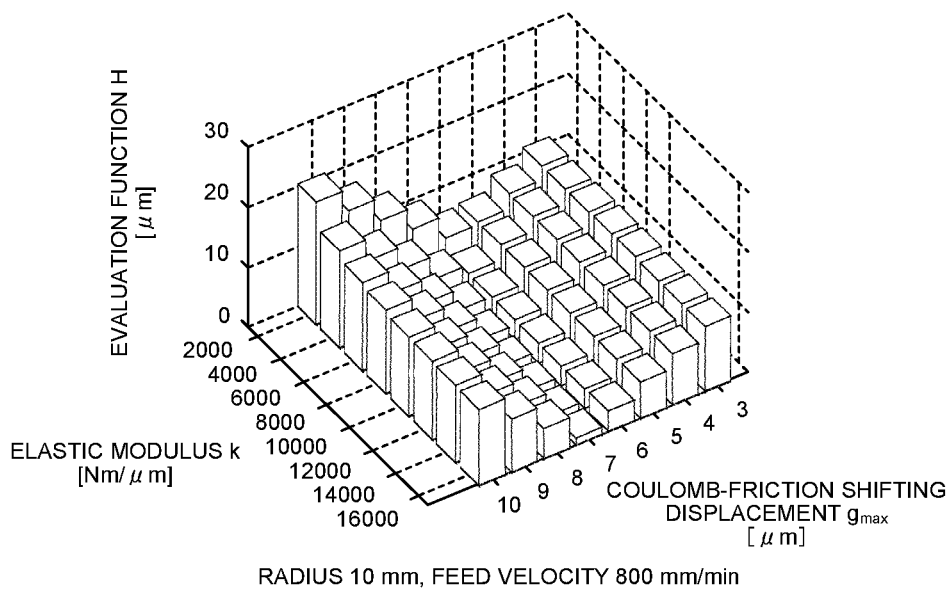
FIG. 39 is a three-dimensional bar graph illustrating the relation between the respective values of the two parameters "k" and "$g_{max}$" and the value of the evaluation function H on an arc condition 1 in the fifth embodiment.
Figure 40:
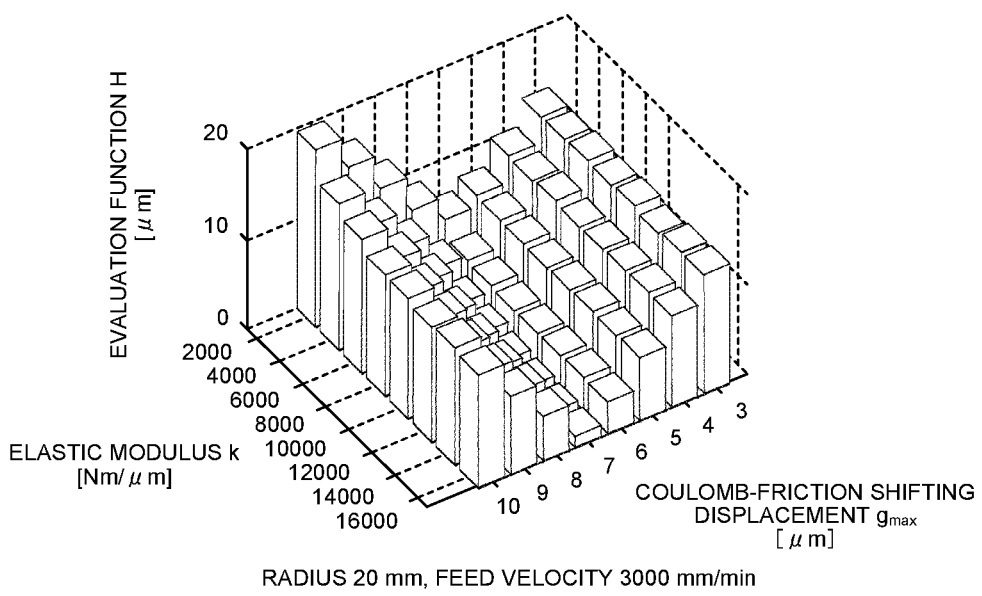
FIG. 40 is a three-dimensional bar graph illustrating the relation between the respective values of the two parameters "k" and "$g_{max}$" and the value of the evaluation function H on an arc condition 2 in the fifth embodiment.
Figure 41:
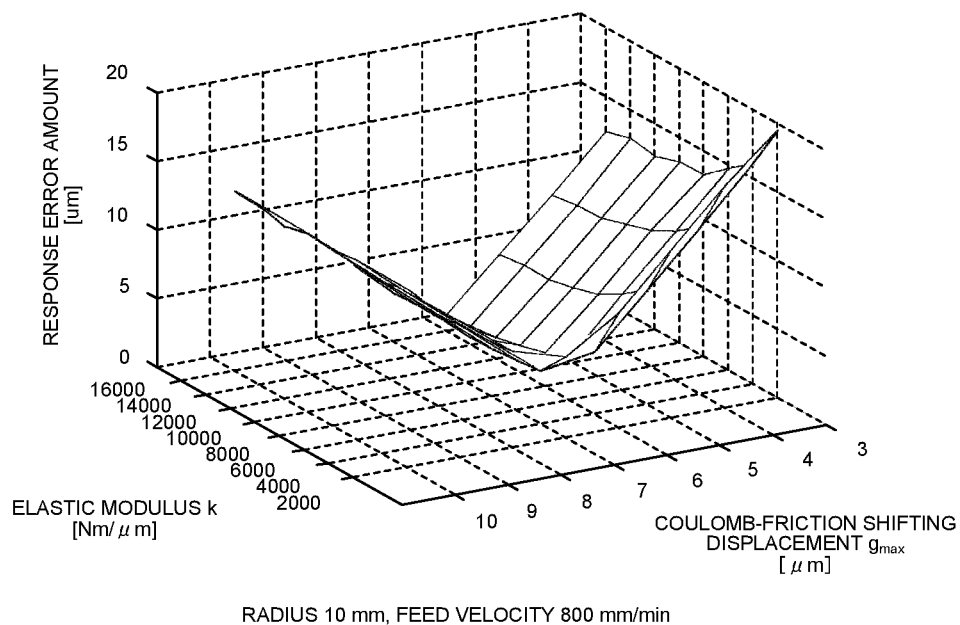
FIG. 41 is a three-dimensional mesh graph illustrating the relation between the respective values of the two parameters "k" and "$g_{max}$" and the value of the evaluation function H on the arc condition 1 in the fifth embodiment.
Figure 42:
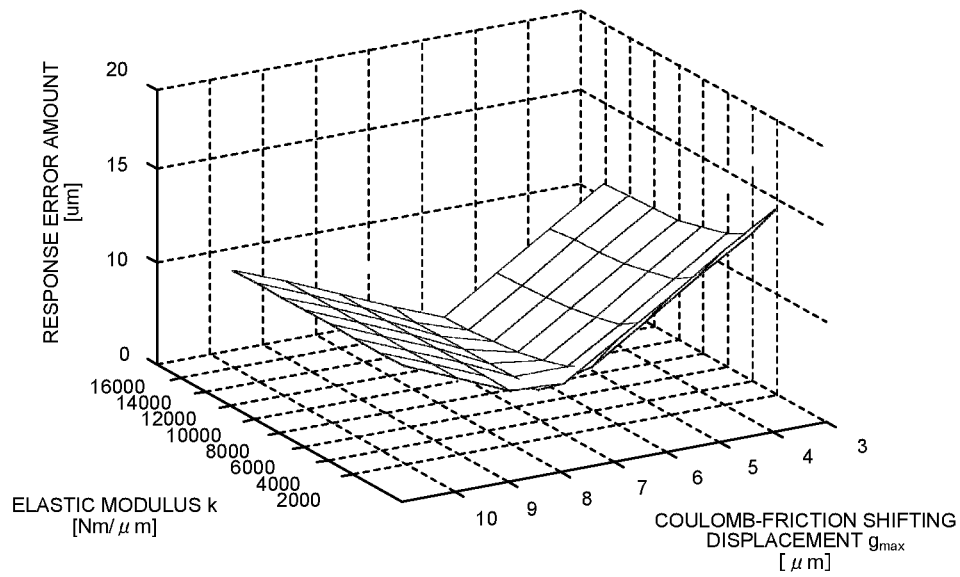
FIG. 42 is a three-dimensional mesh graph illustrating the relation between the respective values of the two parameters "k" and "$g_{max}$" and the value of the evaluation function H on the arc condition 2 in the fifth embodiment.

FIG. 39 is a three-dimensional bar graph illustrating the relation between the respective values of the two parameters "k" and "$g_{max}$" and the value of the evaluation function H on the arc condition 1 in the fifth embodiment. FIG. 40 is a three-dimensional bar graph illustrating the relation between the respective values of the two parameters "k" and "$g_{max}$" and the value of the evaluation function H on the arc condition 2 in the fifth embodiment. FIG. 41 is a three-dimensional mesh graph illustrating the relation between the respective values of the two parameters "k" and "$g_{max}$" and the value of the evaluation function H on the arc condition 1 in the fifth embodiment. FIG. 42 is a three-dimensional mesh graph illustrating the relation between the respective values of the two parameters "k" and "$g_{max}$" and the value of the evaluation function H on the arc condition 2 in the fifth embodiment. The input-output unit 8 outputs the graphs illustrated in FIGS. 39 and 40 or in FIGS. 41 and 42 to the output device 89.

Figure 43:
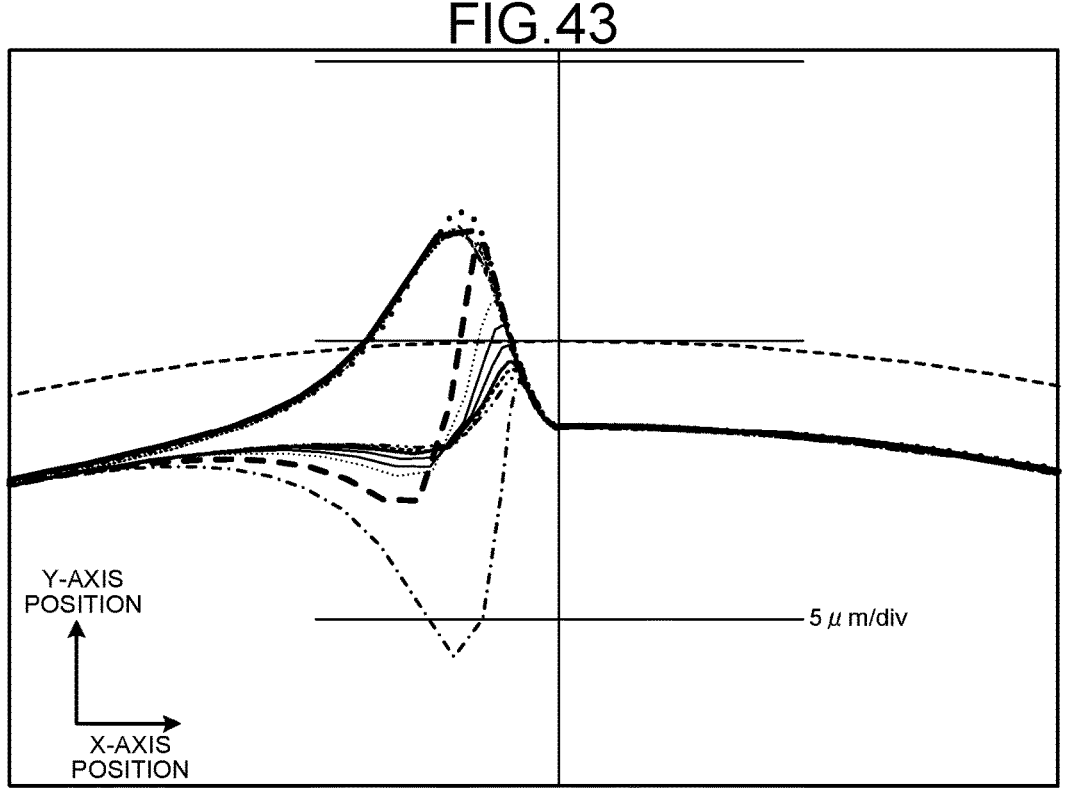
FIG. 43 is an enlarged diagram of motion trajectories on the arc condition 1 at a position where the quadrant is changed over to another quadrant, displayed on the output device in the fifth embodiment.
Figure 44:
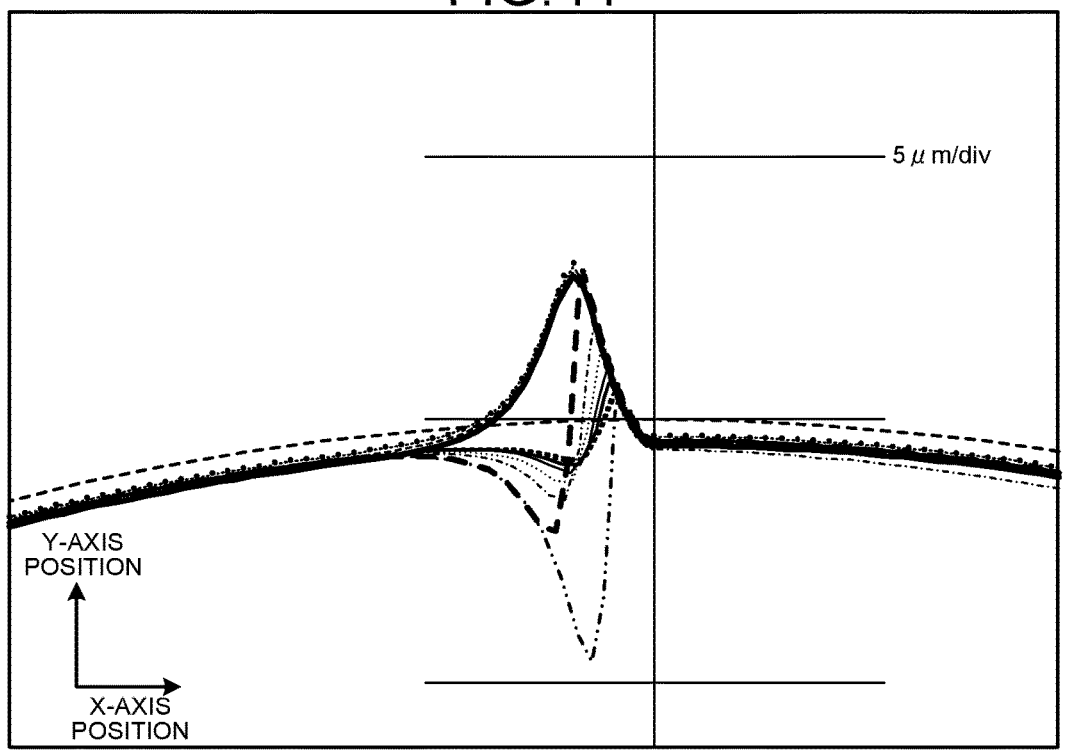
FIG. 44 is an enlarged diagram of motion trajectories on the arc condition 2 at a position where the quadrant is changed over to another quadrant, displayed on the output device in the fifth embodiment.

Further, at Step S310, the control parameter adjustment device 1c draws and superimposes all the motion trajectories, each of which corresponds to the parameters "k" and "$g_{max}$" by which the evaluation function is equal to or less than the set allowable value H0, and then displays these motion trajectories on the output device 89 as illustrated in FIGS. 43 and 44. FIG. 43 is an enlarged diagram of motion trajectories on the arc condition 1 at a position where the quadrant is changed over to another quadrant, which is displayed on the output device 89 in the fifth embodiment. FIG. 44 is an enlarged diagram of motion trajectories on the arc condition 2 at a position where the quadrant is changed over to another quadrant, displayed on the output device 89 in the fifth embodiment. In FIGS. 43 and 44, the horizontal axis represents the X-axis position, and the vertical axis represents the Y-axis position. "5 μm/div" shows the vertical-axis scale division of 5 μm.

At Step S311, a user selects the most preferable combination of the values of the parameters "k" and "$g_{max}$" for the two motion trajectories from among the graphs of the evaluation function H, which are displayed on the output device 89, where the evaluation function H is measured respectively on the two types of arc conditions. The user then inputs the selected combination to the input device 88.

As described above, by using the control parameter adjustment device 1c according to the fifth embodiment, the user can determine a more appropriate parameter combination on different motion conditions.

Sixth Embodiment

The configuration of a control parameter adjustment device in a sixth embodiment is identical to the configuration of the control parameter adjustment device 1b according to the second embodiment.

Figure 45:
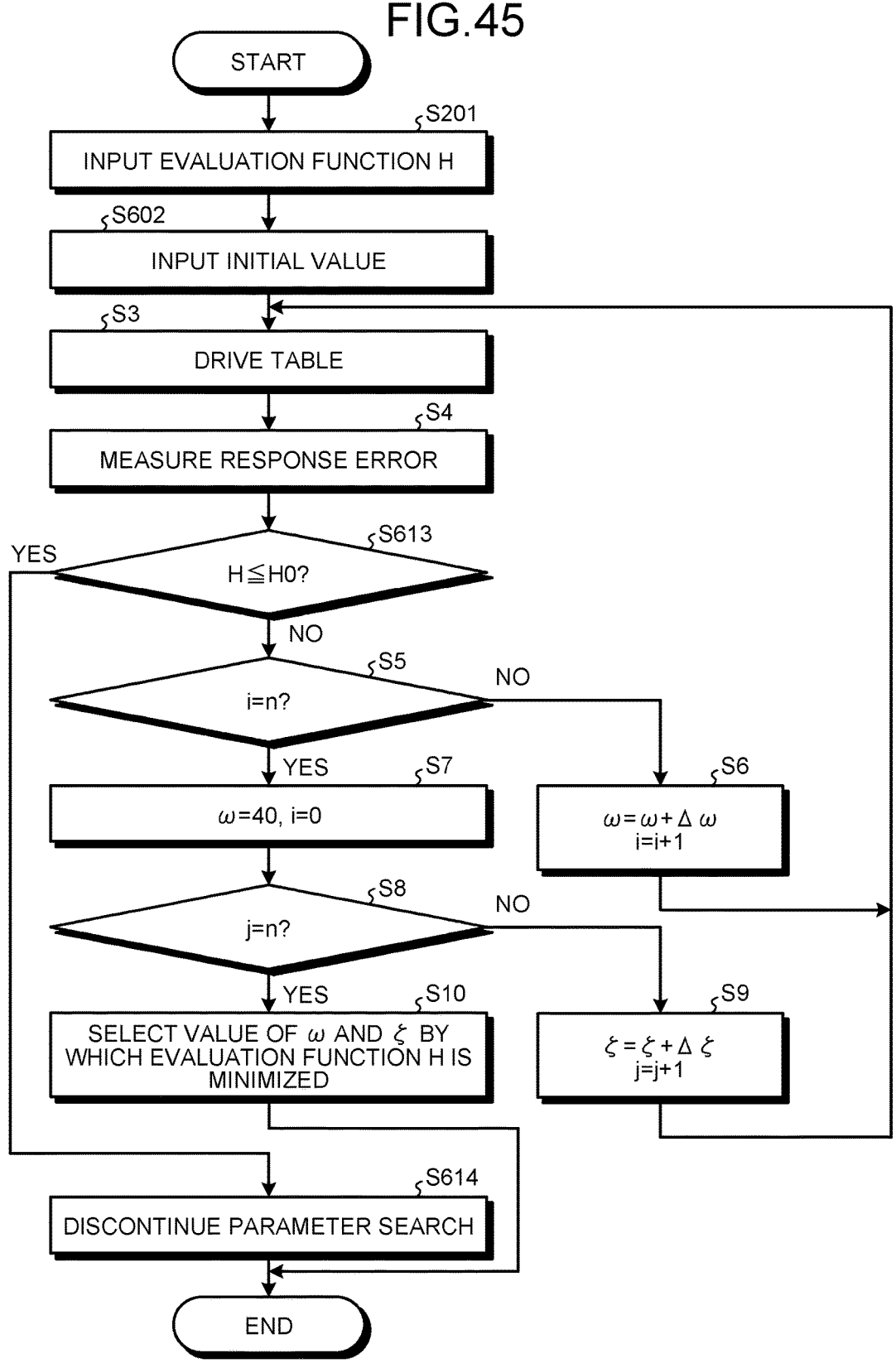
FIG. 45 is a flowchart illustrating a control parameter adjustment procedure using a control parameter adjustment device in a sixth embodiment of the present invention.

FIG. 45 is a flowchart illustrating a control parameter adjustment procedure using the control parameter adjustment device in the sixth embodiment of the present invention. Described are the differences between the flowchart in FIG. 45 and the flowchart in FIG. 14.

At Step S602 in FIG. 45, in addition to the process at Step S202 in FIG. 14, a user inputs and sets the allowable value H0 of the evaluation function H. In FIG. 45, Step S613 is inserted between Steps S4 and S5, and Step S614 is further added. In FIG. 45, Steps S210, S211, and S212 in FIG. 14 are replaced with Step S10 identical to FIG. 7.

In parameter optimization, not on the condition that a correction-model parameter minimizes the evaluation function, often there is no problem when the evaluation function falls within the range of a certain allowable value or less. In such a case, it suffices that the measurement is not performed on all the parameter combinations.

Therefore, in the sixth embodiment, at Step S613, each time the measurement on the single-motion condition is completed, the evaluation function H is calculated to determine whether or not H≤H0. When the value of the evaluation function H is equal to or smaller than the allowable value H0 input at Step S602 (YES at Step S613), the parameter search is stopped (Step S614). The value of ω and the value of ζ obtained at that time are stored in the memory 42 or the storage device 43. The parameter search unit 7 sets a combination of these parameter values in the correction model unit 6 to correct the model.

When the value of the evaluation function H is greater than the allowable value H0 (NO at Step S613), the process flow advances to Step S5 to change the parameters and repeat the measurement identically to the first embodiment. When H≤H0 does not hold true, the process flow eventually branches to YES at Step S8 to perform Step S10 in FIG. 7.

As described above, by using the control parameter adjustment device 1b according to the sixth embodiment, the user can find a parameter combination, by which the evaluation function H is equal to or less than the allowable value H0, in a reduced period of time.

Seventh Embodiment

Figure 46:
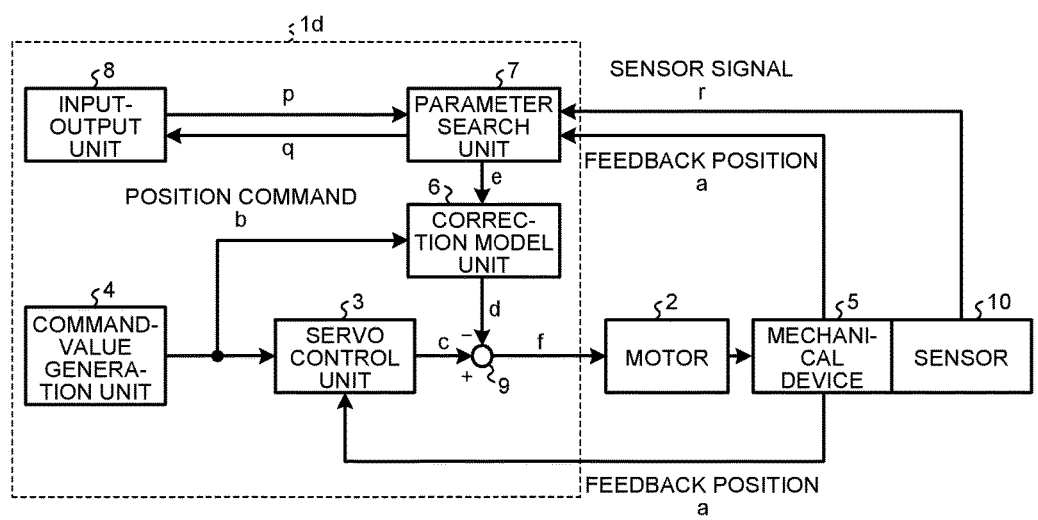
FIG. 46 is a block diagram illustrating a configuration of a control parameter adjustment device according to a seventh embodiment of the present invention.

FIG. 46 is a block diagram illustrating a configuration of a control parameter adjustment device 1d according to a seventh embodiment of the present invention. The difference in configuration between the control parameter adjustment device 1d according to the seventh embodiment, and the control parameter adjustment device 1b according to the second embodiment, is the presence or absence of a sensor 10.

In a machine tool, in order to improve the accuracy of a workpiece, it is necessary to feedback a relative displacement between the edge of a tool and the edge of a workpiece. However, it is general that the position of the table 84 can only be measured by using the table-position detector 85. Therefore, when there is a mechanical structure such as a main shaft between the table 84 and the tool, a response of the table position differs from the tool-edge position. Accordingly, even when a parameter of the correction model unit 6 is adjusted at the table position, the correction parameter may not be optimized to the tool-edge position.

In the seventh embodiment, a sensor signal "r", measured by the sensor 10 attached to the vicinity of the tool edge, is input to the parameter search unit 7. The sensor signal "r" shows a relative displacement between a tool and a workpiece. The parameter search unit 7 corrects the model of the correction model unit 6 on the basis of the sensor signal "r".

A specific example of the sensor 10 is an acceleration sensor that measures an acceleration, or a two-dimensional encoder that measures a relative displacement between a tool and a workpiece.

The parameter search unit 7 can use the sensor signal "r" for the evaluation function, and therefore can evaluate the tool-edge characteristics more accurately as compared to that of using the feedback position "a". In the case of using a grid encoder as the sensor 10, it can be thought that the evaluation function in the seventh embodiment uses the difference between the sensor signal "r" and the position command "b" as expressed by the following equation (10).

[Equation 10]

$$H = \max(\mathrm{abs}(b-r)) \quad (10)$$

As described above, the control parameter adjustment device 1d according to the seventh embodiment is used, and therefore the sensor signal "r" is used for the response-error evaluation function H. Accordingly, this evaluation function H can be used also for the evaluation of the edge of a machine.

The configuration described in the above embodiments is only an example of the contents of the present invention. The configuration can be combined with other publicly known techniques, and the present invention can be configured while modifying it without departing from the scope of the invention, such as omitting or changing a part of the configuration.

In the above embodiments, the control parameter adjustment device has been described with using a servo control device that uses a rotary motor as a specific example. However, it is still possible for a servo control device, in which a mechanical system is driven by an actuator other than a rotary motor, to control the mechanical system by using the same control method. The control method of the above embodiments is not limited by a mechanical configuration of the servo control device.

REFERENCE SIGNS LIST 1a, 1b, 1c control parameter adjustment device, 2, 2a, 2b motor, 3, 3a, 3b servo control unit, 4 command-value generation unit, 5, 5a, 5b mechanical device, 6, 6a, 6b correction model unit, 7 parameter search unit, input-output unit, 9, 9a, 9b adder-subtractor, 10 sensor, 30, 32 addition-subtraction unit, 31 position control unit, 33, 615, 616 differential calculation unit, velocity control unit, 41 calculation device, 42 memory, 43 storage device, 44 communication device, 61 servo-control-unit model, 62 friction model, 611 position-control-unit model, 612 velocity-control-unit model, 613 mechanical model, 614 displacement calculation unit, 621 displacement-dependent friction model, 622 velocity-dependent friction model, 623 adder, 81 motor-position detector, 82 ball screw, 83 nut, 84 table, 85 table-position detector.

The invention claimed is:
1. A control parameter adjustment device comprising:
a hardware processor; and
a non-transitory computer readable recording medium storing a program which, when executed by the hardware processor, causes the control parameter adjustment device to:
generate a position command;
calculate a drive command such that a response position of a driven object follows the position command;
generate, by using a model expressed by two or more different types of parameters, a correction command for correcting a response error that is a difference between the position command and the response position;
correct the model by using a combination of values of the parameters by which the response error is minimized, the combination of the values of the parameters being from among a plurality of combinations of the values of the parameters;
drive the driven object in accordance with the drive command and the correction command; and
receive a feedback signal indicative of the response position of the driven object from the driven object as the two or more different types of parameters are sequentially changed, and select the combination of the values of the parameters by which the response error is minimized based on the feedback signal, to thereby correct the model.

2. The control parameter adjustment device according to claim 1, wherein
two or more types of the parameters are dependent parameters that cannot express their influence on the response error as a linear expression of the parameters.

3. The control parameter adjustment device according to claim 1, wherein
the model is a model that expresses a quadrant projection caused during arc motions.

4. The control parameter adjustment device according to claim 1, wherein
the model is a transfer function model in which mechanical vibrations are approximated.

5. The control parameter adjustment device according to claim 1, wherein
in a case where a number of types of the parameters is two, a relation between a plurality of combinations of searched values of the parameters and the response error that corresponds to each of the combinations is illustrated by a three-dimensional graph.

6. The control parameter adjustment device according to claim 1, wherein
in a case where a number of types of the parameters is three or more,
a relation between a plurality of combinations of searched values of two types of the parameters and the response error that corresponds to each of the combinations is plotted in a three-dimensional graph, and
a plurality of the three-dimensional graphs corresponding to different values of parameters other than the two types of the parameters are displayed.

7. The control parameter adjustment device according to claim 1, wherein the non-transitory computer readable recording medium stores the program which, when executed by the hardware processor, further causes the control parameter adjustment device to:

correct the model further based on a signal of a sensor attached to the driven object.

8. A control parameter adjustment device comprising:
a hardware processor; and
a non-transitory computer readable recording medium storing a program which, when executed by the hardware processor, causes the control parameter adjustment device to:
generate a position command;
calculate a drive command such that a response position of a driven object follows the position command;
generate, by using a model expressed by two or more different types of parameters, a correction command for correcting a response error that is a difference between the position command and the response position;
correct the model by using a combination of values of the parameters by which the response error is equal to or less than an allowable value, the combination of the values of the parameters being from among a plurality of combinations of the values of the parameters;
drive the driven object in accordance with the drive command and the correction command; and
receive a feedback signal indicative of the response position of the driven object from the driven object as the two or more different types of parameters are sequentially changed, and select the combination of the values of the parameters by which the response error is equal to or less than the allowable value based on the feedback signal, to thereby correct the model.

9. The control parameter adjustment device according to claim 8, wherein the non-transitory computer readable recording medium stores the program which, when executed by the hardware processor, further causes the control parameter adjustment device to:
display motion trajectories based on searching for a plurality of different combinations of the values of the parameters by which the response error is equal to or less than the allowable value, the motion trajectories respectively corresponding to the different combinations of the values of the parameters; and
receive a combination of the values of the parameters selected by a user from among the different combinations of the values of the parameters.

10. The control parameter adjustment device according to claim 8, wherein the non-transitory computer readable recording medium stores the program which, when executed by the hardware processor, further causes the control parameter adjustment device to:
stop searching for the parameters at a time when the response error becomes equal to or less than the allowable value.

11. The control parameter adjustment device according to claim 8, wherein
two or more types of the parameters are dependent parameters that cannot express their influence on the response error as a linear expression of the parameters.

12. The control parameter adjustment device according to claim 8, wherein
the model is a model that expresses a quadrant projection caused during arc motions.

13. The control parameter adjustment device according to claim 8, wherein
the model is a transfer function model in which mechanical vibrations are approximated.

14. The control parameter adjustment device according to claim 8, wherein
in a case where a number of types of the parameters is two, a relation between a plurality of combinations of searched values of the parameters and the response error that corresponds to each of the combinations is illustrated by a three-dimensional graph.

15. The control parameter adjustment device according to claim 8, wherein
in a case where the number of types of the parameters is three or more,
a relation between a plurality of combinations of searched values of two types of the parameters and the response error that corresponds to each of the combinations is plotted in a three-dimensional graph, and
a plurality of the three-dimensional graphs corresponding to different values of parameters other than the two types of the parameters are displayed.

16. The control parameter adjustment device according to claim 8, wherein the non-transitory computer readable recording medium stores the program which, when executed by the hardware processor, further causes the control parameter adjustment device to:
correct the model further based on a signal of a sensor attached to the driven object.

* * * * *